United States Patent
KIM et al.

(10) Patent No.: US 12,491,271 B2
(45) Date of Patent: Dec. 9, 2025

(54) POSITRON EMISSION TOMOGRAPHY RADIOTRACER FOR DISEASES ASSOCIATED WITH TRANSLOCATOR PROTEIN OVEREXPRESSION, TRANSLOCATOR PROTEIN-TARGETING LIGAND FOR FLUORESCENCE IMAGING-GUIDED SURGERY AND PHOTODYNAMIC THERAPY, AND PRODUCTION METHODS THEREFOR

(71) Applicant: Seoul National University R&DB Foundation, Seoul (KR)

(72) Inventors: Sang Eun KIM, Seoul (KR); Byung Chul Lee, Hanam-si (KR); Sang Hee Lee, Seongnam-si (KR); Nunzio Denora, Conversano (IT); Valentino Laquintana, Monopoli (IT); Angela Assunta Lopedota, Matera (IT); Annalisa Cutrignelli, Bari (IT); Massimo Franco, Bari (IT)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 0 days.

(21) Appl. No.: 18/419,562

(22) Filed: Jan. 23, 2024

(65) Prior Publication Data
US 2024/0156997 A1   May 16, 2024

Related U.S. Application Data

(63) Continuation of application No. 16/929,803, filed on Jul. 15, 2020, now abandoned, which is a continuation of application No. PCT/KR2018/015117, filed on Nov. 30, 2018.

(30) Foreign Application Priority Data

Jan. 19, 2018 (KR) .................. 10-2018-0007226

(51) Int. Cl.
A61K 51/04 (2006.01)
C07B 59/00 (2006.01)

(52) U.S. Cl.
CPC ........ A61K 51/0455 (2013.01); C07B 59/002 (2013.01)

(58) Field of Classification Search
CPC ............ A61K 51/0455; A61K 49/0052; A61K 41/0038; C07B 59/002; C07B 59/00; A61P 25/00; A61P 35/00

USPC ........................................ 424/1.89
See application file for complete search history.

(56) References Cited

U.S. PATENT DOCUMENTS

| | | |
|---|---|---|
| 2007/0031328 A1 | 2/2007 | Kung |
| 2011/0044899 A1 | 2/2011 | Chezal et al. |
| 2016/0310604 A1 | 10/2016 | Chung et al. |
| 2017/0137341 A1 | 5/2017 | Gouverneur et al. |

FOREIGN PATENT DOCUMENTS

| | | |
|---|---|---|
| KR | 10-2004-0065076 A | 7/2004 |
| KR | 10-1605291 B1 | 3/2016 |
| KR | 10-2016-0074683 A | 6/2016 |

OTHER PUBLICATIONS

Mara Perrone, et al., "A Novel PET Imaging Probe for the Detection and Monitoring of Translocator Protein 18 kDa Expression in Pathological Disorders," Scientific Reports, 2016, vol. 6, No. 20422, pp. 1-13 (13 pages total).

G. Trapani, et al, "Synthesis and Binding Affinity of 2-Phenylimidazo[1,2-a]pyridine Derivatives for both Central and Peripheral Benzodiazepine Receptors. A New Series of High-Affinity and Selective Ligands for the Peripheral Type," J. Med. Chem., 1997, vol. 40, No. 19, pp. 3109-3118 (10 pages total).

Victor W. Pike, "Hypervalent aryliodine compounds as precursors for radiofluorination," J. Label Compd. Radiopharm., 2018, vol. 61, pp. 196-227 (33 pages total).

Thomas Keller, et al., "Radiosynthesis and Preclinical Evaluation of [$^{18}$F]F-DPA, A Novel Pyrazolo[1,5a]pyrimidine Acetamide TSPO Radioligand, in Healthy Sprague Dawley Rats," Mol. Imaging Biol., 2017, vol. 19, pp. 736-745 (10 pages total).

Valentino Laquintana et al., "Peripheral Benzodiazepine Receptor ligand-PLGA polymer conjugates potentially useful as delivery systems of apoptotic agents," J. Control. Rel., 2009, vol. 137, pp. 185-195 (11 pages total).

Carolyn R. Bertozzi, et al., "The Synthesis of Heterobifunctional Linkers for the Conjugation of Ligands to Molecular Probes," J. Org. Chem., 1991, vol. 56, No. 13, pp. 4326-4329 (4 pages total).

Andrew V. Mossine, et al., "Synthesis of [$^{18}$F]Arenes via the Copper-Mediated [$^{18}$F]Fluorination of Boronic Acids," Org. Lett., 2015, vol. 17, pp. 5780-5783 (4 pages total).

*Primary Examiner* — Jake M Vu
*Assistant Examiner* — Sean R Donohue
(74) *Attorney, Agent, or Firm* — Sughrue Mion, PLLC

(57) ABSTRACT

A fluorine-18-labeled positron emission tomography (PET) radiotracer for diagnosing neuroinflammation, stroke or cerebral infarction and a method for using the radiotracer are provided.

2 Claims, 7 Drawing Sheets

FIG. 6

| Compound | Ki (nM) for TSPO | Ki (nM) for TSPO |
|---|---|---|
| BS224 | 0.41 | >10$^5$ |
| CB251 | 0.27 | >10$^5$ |
| PK11195 | 1.38 | >10$^5$ |
| PBR28 | 6.1 | - |
| diazepamb | - | 6.2 |
| flunitrazpam | - | 5.1 |

POSITRON EMISSION TOMOGRAPHY RADIOTRACER FOR DISEASES ASSOCIATED WITH TRANSLOCATOR PROTEIN OVEREXPRESSION, TRANSLOCATOR PROTEIN-TARGETING LIGAND FOR FLUORESCENCE IMAGING-GUIDED SURGERY AND PHOTODYNAMIC THERAPY, AND PRODUCTION METHODS THEREFOR

CROSS-REFERENCE TO RELATED APPLICATIONS

This application is a continuation application of U.S. application Ser. No. 16/929,803 filed on Jul. 15, 2020, which is a continuation application of International Application No. PCT/KR2018/015117 filed on Nov. 30, 2018, which claims priority to Korean Application No. 10-2018-0007226 filed on Jan. 19, 2018, which applications are incorporated herein by reference.

TECHNICAL FIELD

The present invention relates to a fluorine-18-labeled positron emission tomography radiotracer for targeting translocator protein overexpression, a fluorescent ligand for fluorescence imaging-guided surgery and photodynamic therapy, and production methods therefor, and more particularly to: a fluorine-18-labeled positron emission tomography (PET) radiotracer which is produced using an iodonium salt or boron ester precursor and has an excellent ability to be selectively and specifically taken up into inflammatory regions in neuroinflammation and tumor models; a translocator protein overexpression-targeting fluorescent ligand for fluorescence imaging-guided surgery and photodynamic therapy, which is produced by introducing a fluorescent material instead of fluorine-18; and production methods therefor.

BACKGROUND ART

Microglial cells of the central nervous system contribute to the activation and homeostatic maintenance of the nervous system, and function to maintain neurons or cause apoptosis by secreting neurotrophins, nitric oxide, proinflammatory cytokines, or the like. In fact, the activation of microglial cells has been reported in various neurodegenerative diseases such as Alzheimer's disease, Parkinson's disease, and Huntington's disease, and diseases such as stroke, brain injury, and brain infection. It is also known that the deposition of beta amyloid, which is a factor associated with the onset and progression of Alzheimer's disease, causes the activation of microglial cells.

So far, it has been reported that the activation of microglial cells occurs due to increased expression of the 18-kDa translocator protein (TSPO) present in the mitochondrial membrane, begins within a few hours and continues for several days after disease onset. Therefore, the measurement of the expression level of TSPO in microglial cells in various central nervous system diseases can be used as an in vivo biomarker to assess activation of the cells during the neuroinflammatory process. In practice, (R)—N-methyl-N-(1-methylpropyl)-1-(2-chlorophenyl)isoquinoline-3-carboxamide ([$^{11}$C]PK11195) labeled with C-11 (half-life=20.4 min) as a radiotracer for positron emission tomography (PET) for assessment of TSPO was first developed in 1984.

However, the widespread use of [$^{11}$C] PK11195 has been limited due to problems with the carbon-11 used, such as a short-half life, non-specific binding in the body's brain, and a low signal-to-noise ratio. Over the past 20 years, there have been developed various new radiotracers which overcome the disadvantages of [$^{11}$C] PK11195 for neuroinflammatory imaging, and, as one of them, there was developed N-5-fluoro-2-phenoxyphenyl)-N-(2,5-dimethoxybenzyl)acetamide ([$^{11}$C]DAA1106) labeled with C-11 which showed a 4-fold higher uptake and whose in vivo metabolites did not pass through the blood brain barrier. However, [$^{11}$C] DAA1106 has also been reported to have the problem of showing low TSPO-specific signals in TSPO. C-11-labeled N-acetyl-N-(2-methoxybenzyl)-2-phenoxy-5-pyridinamine ([$^{11}$C] PBR28) developed to overcome the pharmacokinetic disadvantages of this [$^{11}$C]DAA1106) has a high signal-to-noise ratio while maintaining the basic chemical structure of [$^{11}$C]DAA1106, and thus has been verified as an imaging radiotracer for translocator protein overexpression and researched clinically. However, since [$^{11}$C] PBR28 is also a compound labeled with carbon-11 having a short half-life, it is a radiotracer that can be used only for a short time after production, and has disadvantages in that it involves a high possibility of radiation exposure and can be applied only to a maximum of two patients depending on the number of PET systems after produced once.

In contrast, another positron-emitting nuclide, fluorine-18, has a relatively long half-life (half-life=109.8 minutes), and a method of labeling a target compound with fluorine-18 by an organic synthetic method is easy and shows a high yield. Accordingly, fluorine-18 can be applied to diagnosis by radiotracers in a plurality of PET systems over a relatively long period of time after production. Due to these advantages, various PET imaging radiotracers labeled with fluorine-18 have been developed so far by many research groups. In recent years, the present inventors have also developed fluorine-18-labeled 2-(2-(4-(2-fluoroethyl)phenyl)-6,8-dichloroimidazo[1,2-a]pyridine-3-yl)-N,N-dipropylacetamide ([$^{18}$F]CB251) as a radiotracer for TSPO PET imaging, which has a high in vitro binding affinity and shows high TSPO-binding affinity and a high signal-noise ratio in preclinical PET imaging studies. The aliphatic ethyl fluorine-18 used in the synthesis of [$^{18}$F]CB251 has an advantage in that the labeling method is simple, but has disadvantages in that it can be easily metabolized in vivo and in that when fluorine-18 ions produced by the metabolism, which are mainly taken up into bone, are taken up into bone, an image having a lower signal-to-noise ratio compared to a target site is provided. To overcome these advantages of the aliphatic fluorine-18 label, many research groups have attempted to develop compounds in which aromatic compounds are labeled directly with fluorine-18 to increase the in vivo stability of fluorine-18. This aromatic fluorine-18 labeling method is useful for providing in vivo images having a high signal-to-noise ratio by strong carbon-fluorine (C(sp2)-F) bonding, but the reactivity of the aromatic nucleophilic fluorine-18 label is lower than that of the aliphatic fluorine-18 label, and hence various precursors and reaction techniques for increasing the reactivity have still been developed. Accordingly, there is a need for a radiotracer capable of targeting overexpression of a disease-specific translocator protein while allowing simple and efficient labeling with the radioisotope fluorine-18 at the aromatic position of the target compound.

In recent years, high translocator protein overexpression has been found even in cancer cells such as brain cancer, breast cancer, prostate cancer, and bladder cancer cells along with neuroinflammation. Therefore, it is expected that ligands, which have a high binding affinity for translocator protein and provide selective in vivo imaging, will expend their applications not only to radiotracers for PET imaging but also to fluorescent ligands for use in fluorescence imaging-guided surgery and photodynamic therapy which can visually provide information on tumor distribution by providing optimal images during surgery through the introduction of fluorescent materials.

SUMMARY OF THE DISCLOSURE

An object of the present invention is to provide: a PET imaging radiotracer for the diagnosis of neuroinflammation and cancer diseases associated with translocator protein overexpression, which is produced by labeling a translocator protein-targeting ligand with the positron-emitting nuclide fluorine-18; a fluorescent ligand for fluorescence imaging-guided surgery and photodynamic therapy, which is produced by introducing a fluorescent material instead of fluorine-18 to the same ligand; and production methods therefor.

According to one aspect of the present invention, there is provided a method for producing a fluorine-18-labeled PET imaging radiotracer for targeting translocator protein overexpression, the method including the steps of: preparing a fluorine-18 reaction solution by adding, to acetonitrile ($CH_3CN$), water having dissolved therein fluorine-18 produced from a cyclotron, together with a phase transition catalyst, followed by heating to a temperature of 85 to 95° C.; producing either an iodonium salt precursor (type A precursor) by reacting 2-(4-trimethyltinaryl-6,8-dichloroimidazo[1,2-a]pyridin-3-yl)dipropylacetamide with a (diacetoxy)iodoarene derivative, or a boron ester precursor (type B precursor) by reacting 2-(4-bromoaryl-6,8-dichloroimidazo[1,2-a]pyridin-3-yl)dipropylacetamide with bis(pinacolato)diboron; preparing an iodonium salt precursor reaction solution by dissolving the iodonium salt precursor and 2,2,6,6-tetramethylpiperidine-N-oxyl (TEMPO) in $CH_3CN$; preparing a boron ester precursor reaction solution by dissolving the boron ester precursor and a copper catalyst (copper(II) trifluoromethanesulfonate, or tetrakis(pyridine) copper(II) triflate) in dimethylformamide (DMF); and either producing a radiotracer composition containing a fluorine-18-labeled radiotracer compound by adding the iodonium salt precursor reaction solution to the fluorine-18 reaction solution, followed by heating and reaction, or producing a radiotracer composition containing a fluorine-18-labeled radiotracer compound by adding the boron ester precursor reaction solution to the fluorine-18 reaction solution, followed by heating and reaction.

The method may further include the first purification step of purifying the radiotracer composition by adding an aqueous hydrochloric acid solution to the radiotracer composition, followed by adsorption onto a C18 Sep-Pak cartridge, washing with water, and then elution with ethanol.

The method may further include the second purification step of purifying the radiotracer composition using a high-performance liquid chromatography (HPLC) system equipped with a 244 to 264 nm UV detector and a radio-isotope gamma-ray detector.

The step of producing the fluorine-18 reaction solution may be performed by further adding 18-crown-6 ($[C_2H_4O]_6$)/cesium hydrogen carbonate ($CsHCO_3$) as the phase transition catalyst to increase the fluorine-18 labeling reactivity.

According to another aspect of the present invention, there is provided a ligand and a fluorine-18-labeled PET imaging radiotracer for targeting translocator protein overexpression, which are represented by Formula 1 below and produced either by a method including the steps of: preparing a solvent-evaporated fluorine-18 reaction solution by adding, to $CH_3CN$, water having fluorine-18 dissolved therein, followed by heating to a temperature of 85 to 95° C.; producing an iodonium salt precursor (type A precursor) by reacting 2-(4-trimethyltinaryl-6,8-dichloroimidazo[1,2-a] pyridin-3-yl)dipropylacetamide with (diacetoxy)iodoarene; preparing an iodonium salt precursor reaction solution by dissolving the iodonium salt precursor and 2,2,6,6-tetramethylpiperidine-N-oxyl (TEMPO) in $CH_3CN$, and producing a radiotracer composition containing a fluorine-18-labeled radiotracer by adding the iodonium salt precursor reaction solution to the fluorine-18 reaction solution, followed by heating and reaction; producing a boron ester precursor (type B precursor) by reacting 2-(4-bromoaryl-6,8-dichloroimidazo[1,2-a]pyridin-3-yl)dipropylacetamide with bis(pinacolato)diboron; preparing a boron ester precursor reaction solution by dissolving the boron ester precursor and a copper catalyst (copper(II) trifluoromethanesulfonate, or tetrakis (pyridine)copper(II) triflate) in dimethylformamide (DMF); and producing a radiotracer composition containing a fluorine-18-labeled radiotracer by adding the boron ester precursor reaction solution to the fluorine-18 reaction solution, followed by heating and reaction:

[Formula 1]

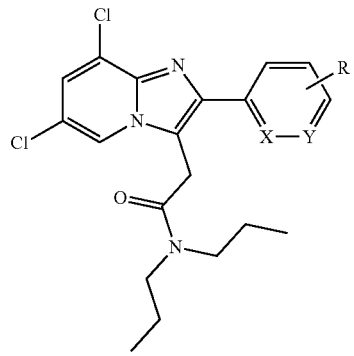

wherein R is $^{18}F$ or $^{19}F$, X is C or N, and Y is C or N.

The 2-fluoroaryl-6,8-dichloroimidazopyridine derivative may be synthesized from an iodonium salt or boron ester precursor (type A or B precursor) represented by Formula 2 below:

[Formula 2]

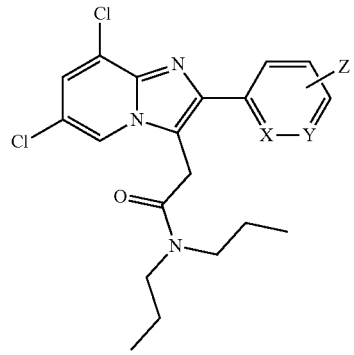

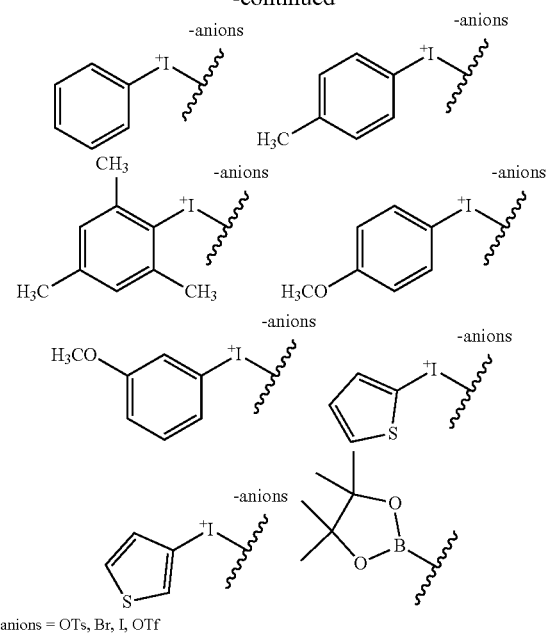

-anions = OTs, Br, I, OTf wherein X is C or N, and Y is C or N.

Z in Formula 2 above may be a functional group selected from the group consisting of iodobenzene tosylate, iodotoluene tosylate, 2-iodo-1,3,5-trimethylbenzene tosylate, 4-iodoanisole tosylate, 3-iodoanisole tosylate, 2-iodothiophene tosylate, 3-iodothiophene tosylate, iodobenzene bromide, iodotoluene bromide, 2-iodo-1,3,5-trimethylbenzene bromide, 4-iodoanizole bromide, 3-iodoanisole bromide, 2-iodocyophene bromide, 3-iodothiophene bromide, iodobenzene iodide, iodotoluene iodide, 2-iodo-1,3,5-trimethylbenzene iodide, 4-iodoanisole iodide, 3-iodoanisole iodide, 2-iodothiophene iodide, 3-iodothiophene iodide, iodobenzene triflate, iodotoluene triflate, 2-iodo-1,3,5-trimethylbenzene triflate, 4-iodoanisole triflate, 3-iodoanisole triflate, 2-iodothiophene triflate, 3-iodothiophene triflate, and pinacol boron ester.

According to still another aspect of the present invention, there is provided a fluorescent ligand for targeting translocator protein overexpression represented by Formula 3 below, which is produced by introducing a fluorescent dye or a sensitizer, which has a functional group for complementary bonding, to a 2-aryl-6,8-dichloroimidazopyridine derivative precursor substituted with one or more polyethylene glycol (PEG) chains containing a functional group, which is generally (universally) used for bonding with a fluorescent molecule as shown in Formula 4 below:

[Formula 3]

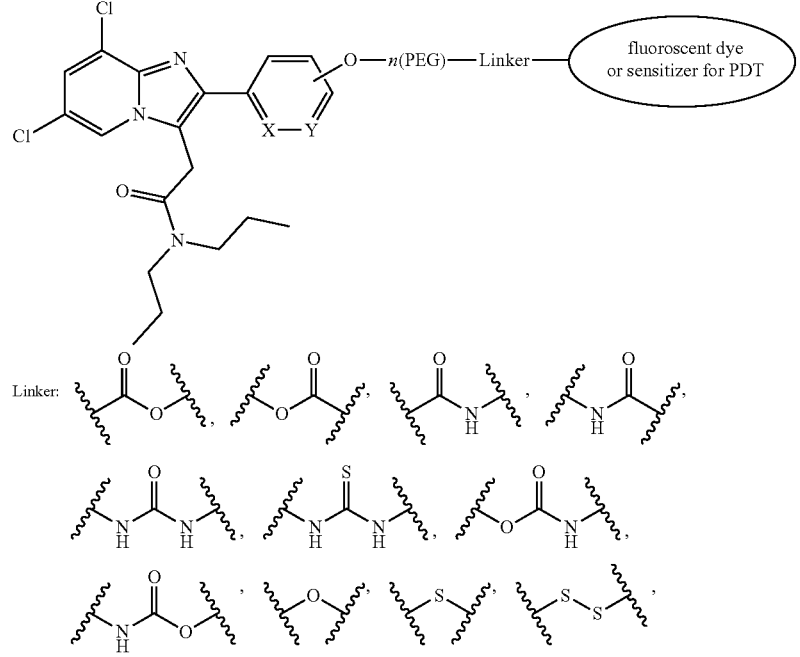

wherein X is C or N, and Y is C or N. In addition, the number (n) of the polyethylene glycol chains is 1 to 10. The linker that connects the PEG to the fluorescent dye or the sensitizer may be a compound selected from the group consisting of ether, amide, ester, urea, urethane, thiourea, and disulfide, and the PEG is substituted at any one of the 2-, 3- and 4-positions of the ring containing X and Y.

The fluorescent ligand having the fluorescent dye or sensitizer introduced thereto may be synthesized from a 2-aryl-6,8-dichloroimidazo[1,2-a]pyridine-3-yl)dipropylacetamide precursor substituted with one or more polyethylene glycol (PEG) chains containing a terminal functional group capable of binding with a fluorescent molecule as shown in Formula 4 below:

[Formula 4]

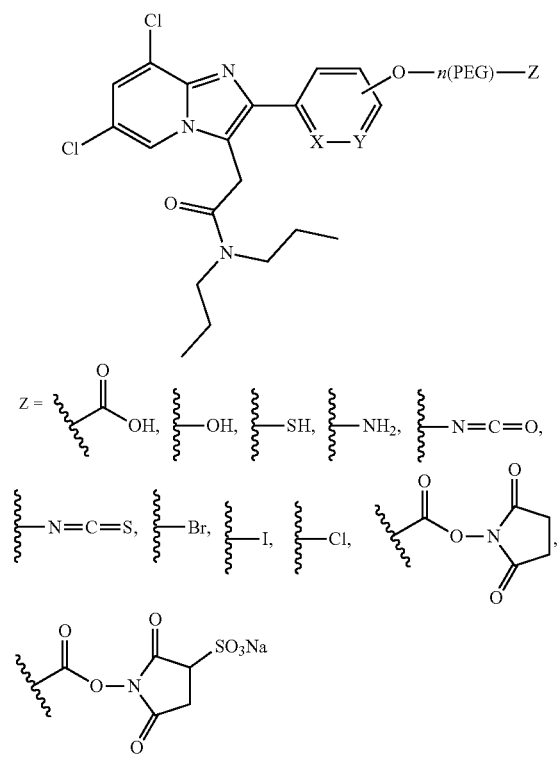

In Formula 4 above, X is C or N, and Y is C or N. In addition, the number (n) of the polyethylene glycol chains is 1 to 10. Z in Formula 4 may be a functional group selected from the group consisting of acid, alcohol, thiol, amine, isocyanate, isothiocyanate, bromide, iodide, chloride, N-succinimidyl ester, and sulfo-N-succinimidyl ester, and the PEG is substituted at any one of the 2-, 3- and 4-positions of the ring containing X and Y.

BRIEF DESCRIPTION OF THE DRAWINGS

The above and other objects, features and advantages of the present invention will be more clearly understood from the following detailed description taken in conjunction with the accompanying drawings, in which:

FIG. 6 is a table comparing the binding affinity of BS224 (Bari and Seoul National University compound 224), which is a ligand for targeting translocator protein overexpression according to the present invention, for TSPO or CBR, with the binding affinities of existing compounds known to bind to TSPO or CBR, in rat cerebrocortical samples;

DETAILED DESCRIPTION OF THE DISCLOSURE

The terms and words used in the specification and the claims should be interpreted as having meanings and concepts relevant to the technical spirit of the present invention based on the principle that an inventor may appropriately define the concept of a term in order to describe his or her invention in the best way.

The present invention will be described in greater detail below with reference to the accompanying drawings. However, the present invention is not limited to the embodiments disclosed below, but may be implemented in various different forms. These embodiments are provided merely to make the disclosure of the present invention thorough and complete and to fully convey the scope of the present invention to those having ordinary skill in the art.

Figure 1:
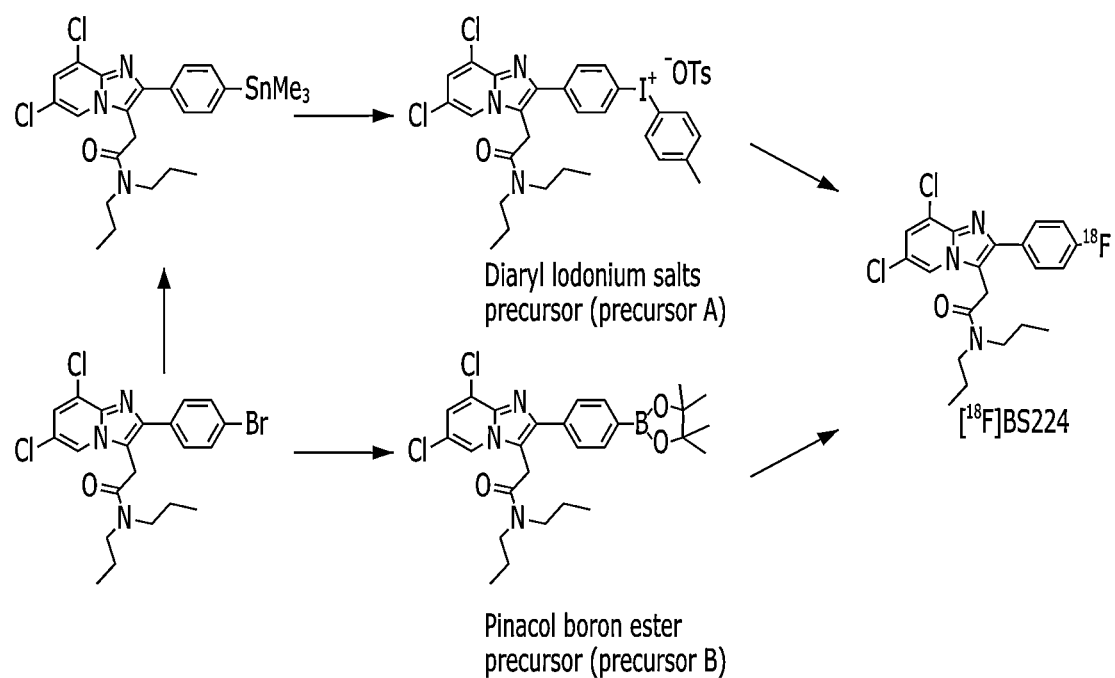
FIG. 1 depicts a reaction scheme showing a process of synthesizing a fluorine-18-labeled radiotracer using an iodonium salt or boron ester precursor according to one embodiment of the present invention.

FIG. 1 depicts a reaction scheme showing a process of synthesizing a fluorine-18-labeled radiotracer using an iodonium salt or boron ester precursor according to one embodiment of the present invention.

Figure 2:
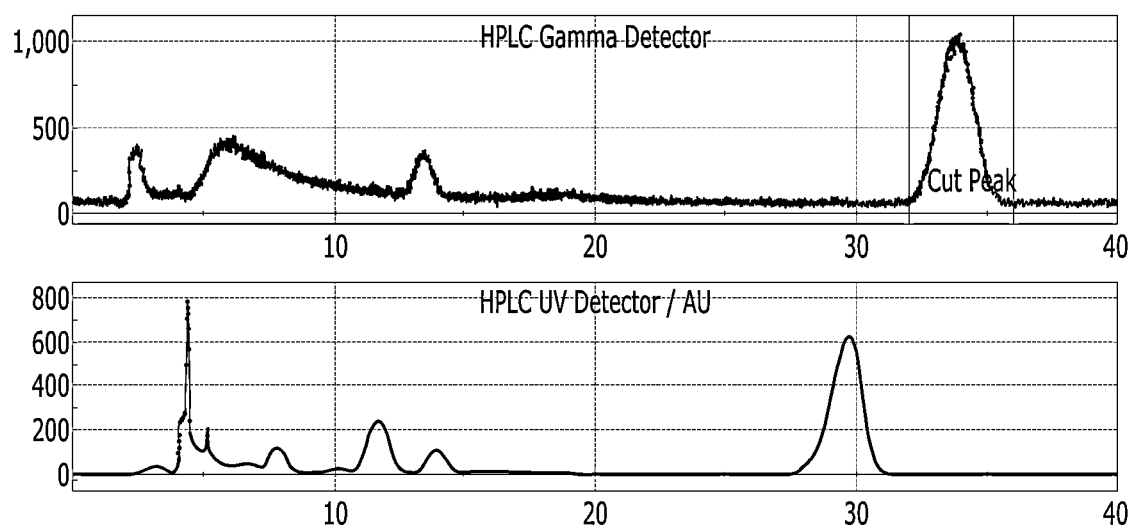
FIG. 2 depicts HPLC chromatograms showing the results of separating a pure fluorine-18-labeled radiotracer from a synthetic mixture, which is a derivative of Formula 2, in an example of the present invention.

FIG. 2 depicts HPLC chromatograms showing the results of separating a pure fluorine-18-labeled radiotracer from a synthetic mixture, which is a derivative of Formula 2, in an example of the present invention.

Figure 3:
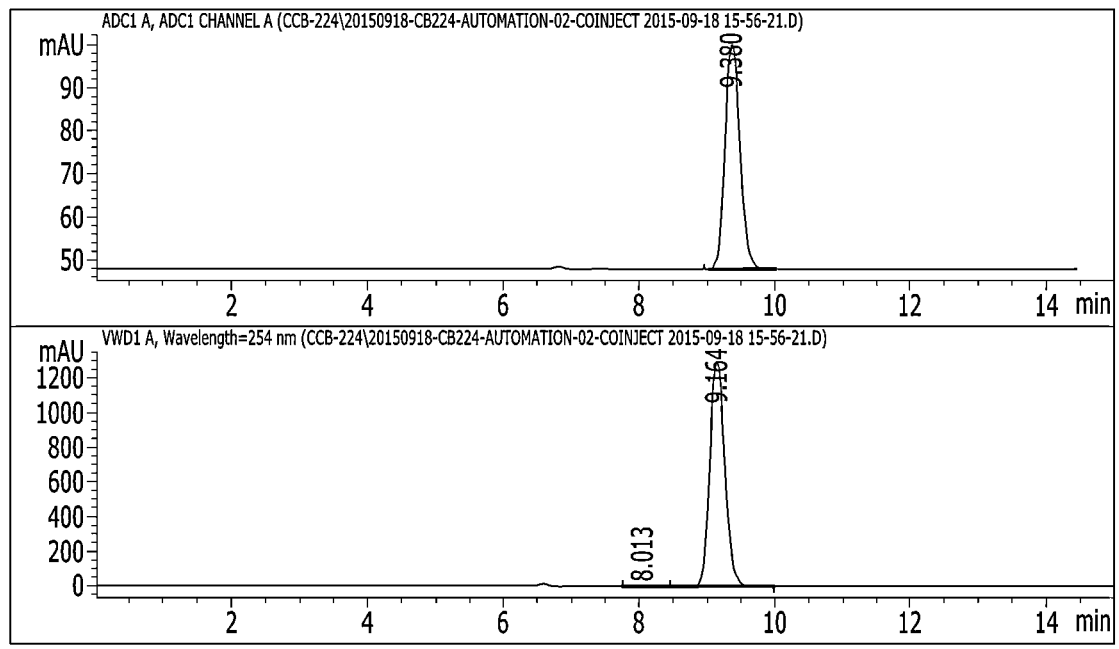
FIG. 3 depicts HPLC chromatograms showing the results of injecting a pure fluorine-18-labeled radiotracer, which is a derivative of Formula 2, simultaneously with a reference material having a non-radioisotope, in order to check whether the pure fluorine-18-labeled radiotracer is the same as the reference material, in an example of the present invention.

FIG. 3 depicts HPLC chromatograms showing the results of injecting a pure fluorine-18-labeled radiotracer, which is a derivative of Formula 2, simultaneously with a reference material having a non-radioisotope, in order to check whether the pure fluorine-18-labeled radiotracer is the same as the reference material, in an example of the present invention.

Figure 4:
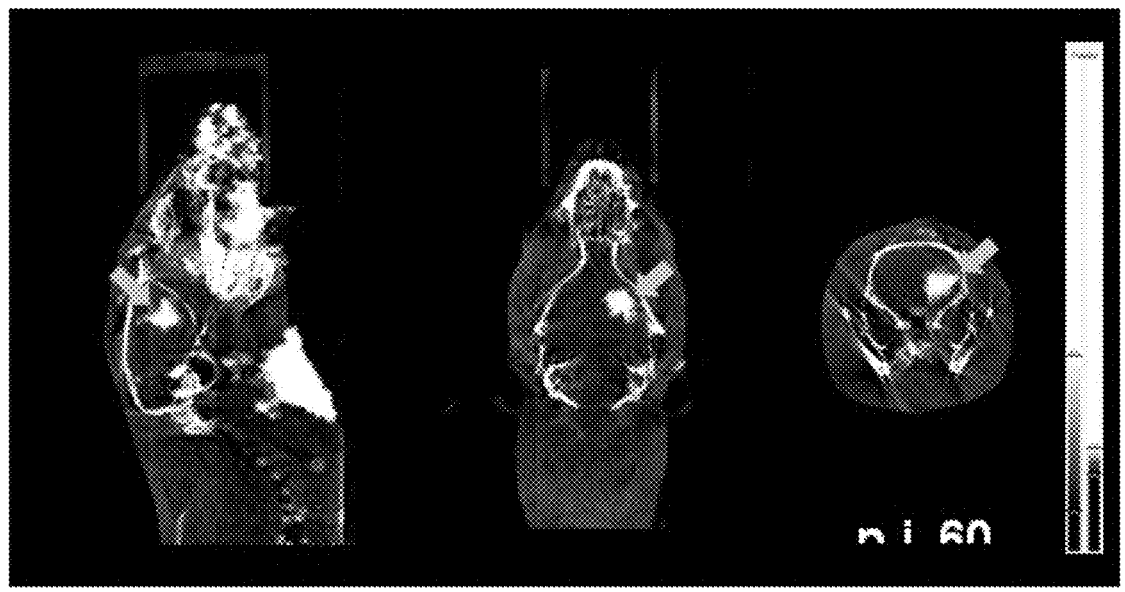
FIG. 4 depicts images showing the uptake of the fluorine-18-labeled radiotracer [$^{18}$F]BS224 ([$^{18}$F]BS compound, $^{18}$F-labeled Bari and Seoul National University compound) in a portion having neuroinflammation induced by lipopolysaccharide (LPS) injected directly into the rat's brain in order to evaluate usefulness against neuroinflammation in a method for evaluating the biological results obtained using a fluorine-18-labeled radiotracer for PET imaging for targeting translocator protein overexpression, synthesized according to the present invention.

FIG. 4 depicts images showing the uptake of the fluorine-18-labeled radiotracer [$^{18}$F]BS224 ([$^{18}$F]BS compound, $^{18}$F- labeled Bari and Seoul National University compound) in a portion having neuroinflammation induced by lipopolysaccharide (LPS) injected directly into the rat's brain in order to evaluate usefulness against neuroinflammation in a method for evaluating the biological results obtained using a fluorine-18-labeled radiotracer for PET imaging for targeting translocator protein overexpression, synthesized according to the present invention.

Figure 5:
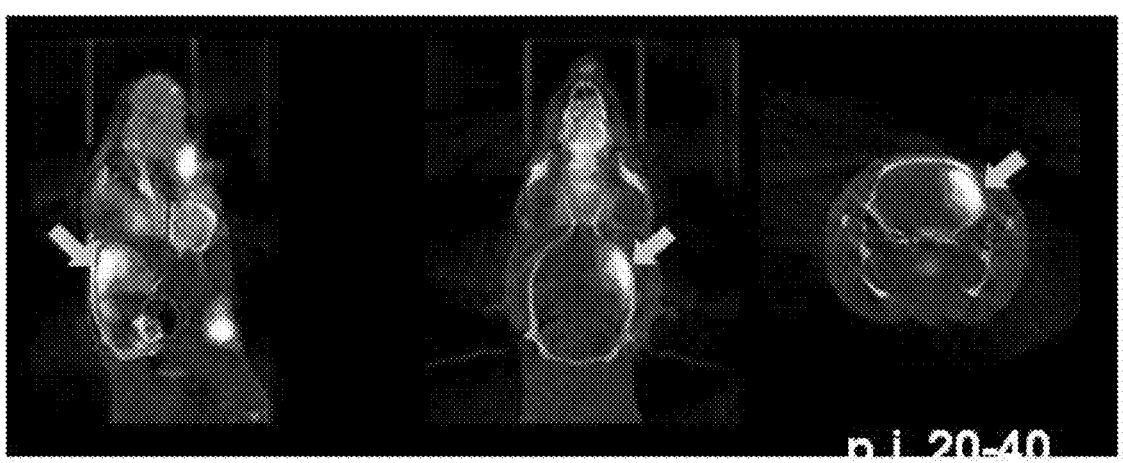
FIG. 5 depicts images showing the uptake of a fluorine-18-labeled radiotracer in a portion having cerebral ischemia induced in a middle cerebral artery occlusion ((MCAO) rat model in order to evaluate diagnostic usefulness for stroke and cerebral infarction diseases in a method for evaluating the biological results obtained using the fluorine-18-labeled radiotracer [$^{18}$F]BS224 for PET imaging for targeting translocator protein overexpression, synthesized according to the present invention.

FIG. 5 depicts images showing the uptake of a fluorine-18-labeled radiotracer in a portion having cerebral ischemia induced in a middle cerebral artery occlusion ((MCAO) rat model in order to evaluate diagnostic usefulness for stroke and cerebral infarction diseases in a method for evaluating the biological results obtained using the fluorine-18-labeled radiotracer [$^{18}$F]BS224 for PET imaging for targeting translocator protein overexpression, synthesized according to the present invention.

FIG. 6 is a table comparing the binding affinity of BS224 (Bari and Seoul National University compound 224), which is a ligand for targeting translocator protein overexpression according to the present invention, for TSPO or CBR, with the binding affinities of existing compounds known to bind to TSPO or CBR, in rat cerebrocortical samples.

Figure 7:
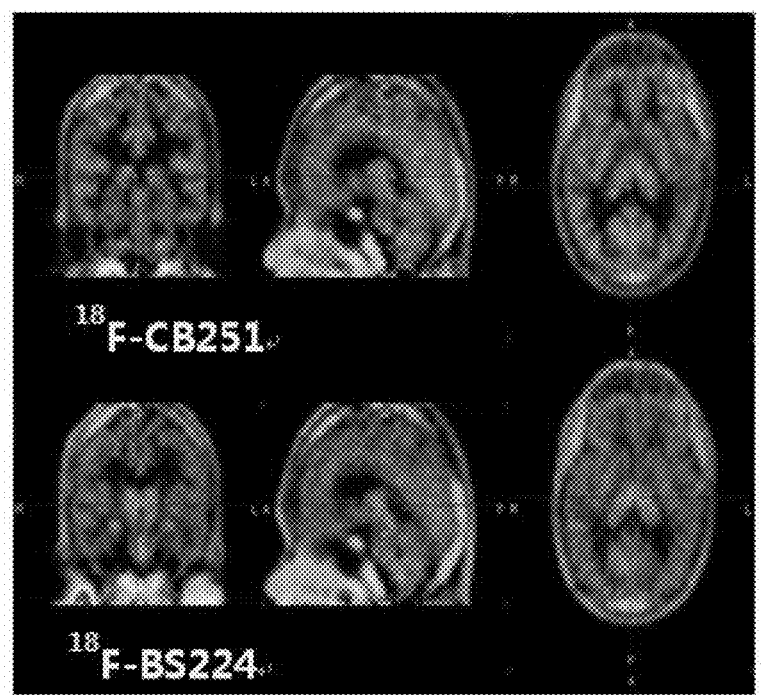
FIG. 7 compares the PET images acquired using the PET imaging radiotracer [$^{18}$F]BS224 for targeting translocator protein overexpression according to the present invention with the PET images acquired using existing [$^{18}$F]CB251 in normal persons.
Figure 7:
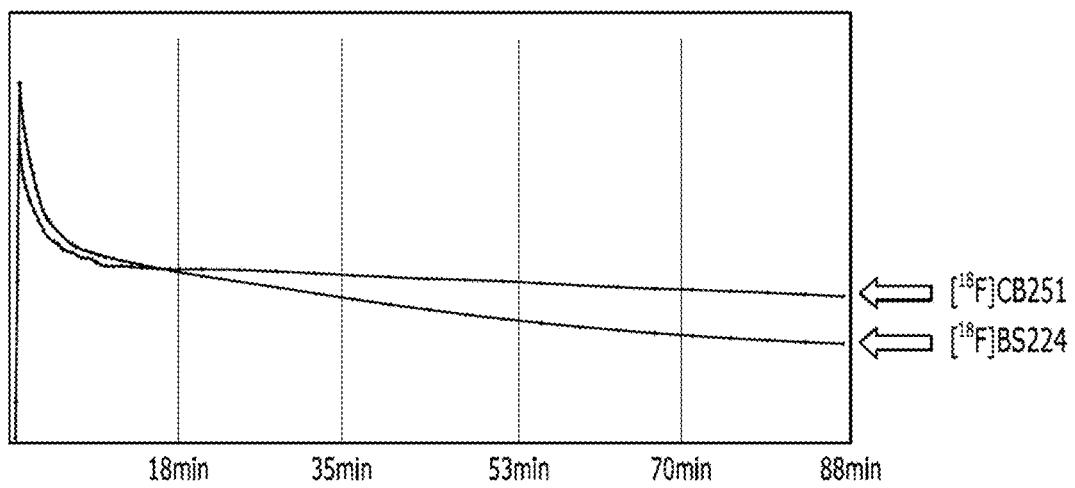

FIG. 7 compares the PET images acquired using the PET imaging radiotracer [$^{18}$F]BS224 for targeting translocator protein overexpression according to the present invention with the PET images acquired using existing [$^{18}$F]CB251 in normal persons.

Figure 8:
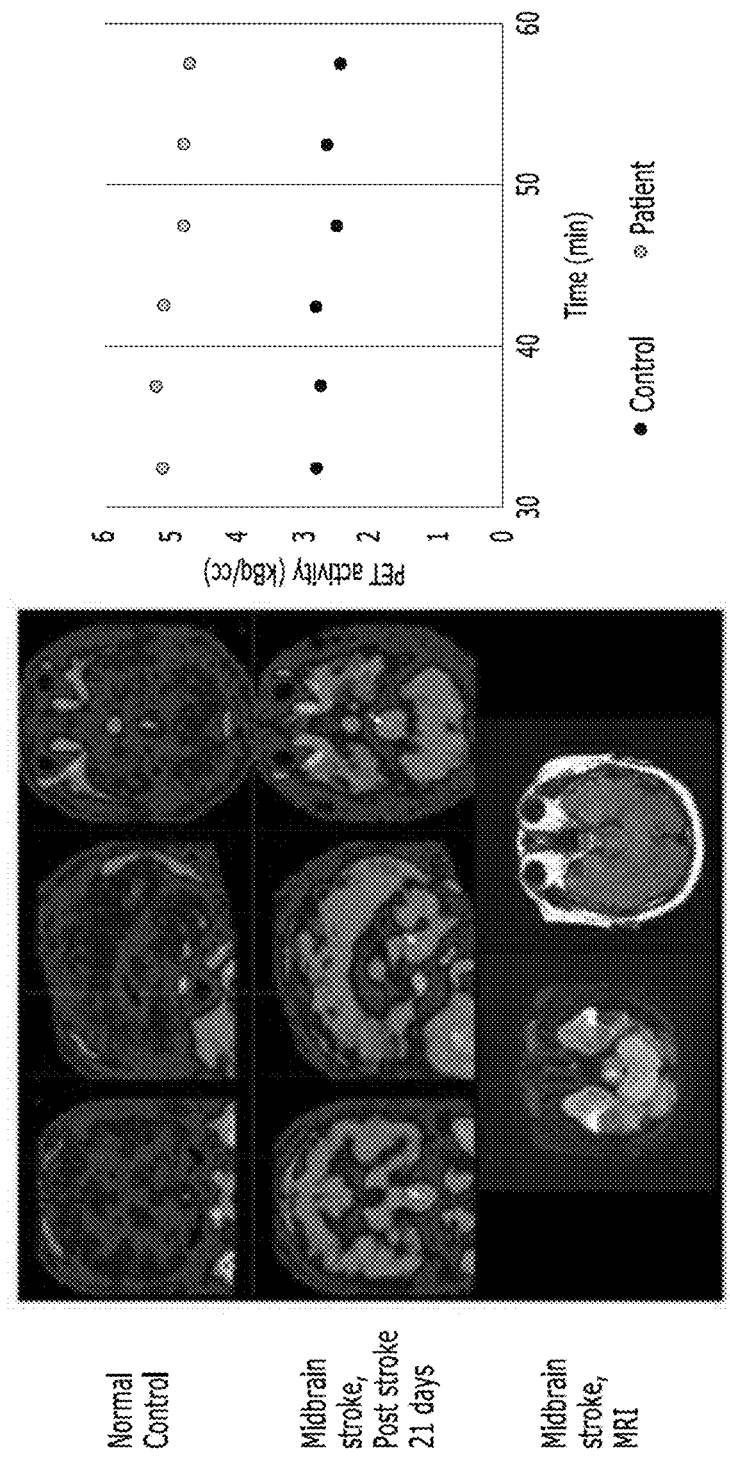
FIG. 8 compares TSPO PET images acquired from a normal person and a midbrain stroke patient using the ligand [$^{18}$F]BS224 for targeting translocator protein overexpression according to the present invention, and shows a graph comparing the radio activity in the lesion region with that of the normal person.

FIG. 8 shows TSPO PET images acquired from a normal person and a midbrain stroke patient using the ligand [$^{18}$F]BS224 for targeting translocator protein overexpression according to the present invention, brain PET images acquired from the same midbrain stroke patient, and a graph comparing the radio activity between the normal brain cell region and the lesion region in the PET images.

Referring to FIG. 1, a method for producing a fluorine-18-labeled PET imaging radiotracer for targeting translocator protein overexpression according to the present invention may include the steps of:
preparing a fluorine-18 reaction solution by adding, to acetonitrile (CH$_3$CN), water having dissolved therein fluorine-18 produced from a cyclotron, together with a phase transition catalyst, followed by heating to a temperature of 85 to 95° C.;
producing either an iodonium salt precursor (type A precursor) by reacting 2-(4-trimethyltinaryl-6,8-dichloroimidazo[1,2-a]pyridin-3-yl)dipropylacetamide with a (diacetoxy)iodoarene derivative, or a boron ester precursor (type B precursor) by reacting 2-(4-bromoaryl-6,8-dichloroimidazo[1,2-a]pyridin-3-yl)dipropylacetamide with bis(pinacolato)diboron;
preparing an iodonium salt precursor reaction solution by dissolving the iodonium salt precursor and 2,2,6,6-tetramethylpiperidine-N-oxyl (TEMPO) in CH$_3$CN;
preparing a boron ester precursor reaction solution by dissolving the boron ester precursor and a copper catalyst (copper(II) trifluoromethanesulfonate, or tetrakis (pyridine) copper (II) triflate) in dimethylformamide (DMF); and
either producing a radiotracer composition containing a fluorine-18-labeled radiotracer compound by adding the iodonium salt precursor reaction solution to the fluorine-18 reaction solution, followed by heating and reaction, or producing a radiotracer composition containing a fluorine-18-labeled radiotracer compound by adding the boron ester precursor reaction solution to the fluorine-18 reaction solution, followed by heating and reaction.

In the present invention, the ligand and the fluorine-18-labeled PET imaging radiotracer for targeting translocator protein overexpression may be compounds represented by Formula 1 below:

[Formula 1]

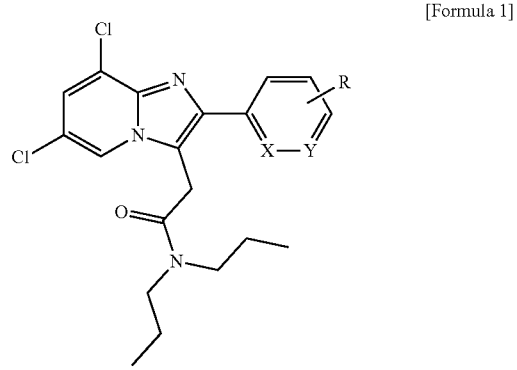

wherein R is $^{18}$F or $^{19}$F, X is C or N, and Y is C or N.

The 2-fluoroaryl-6,8-dichloroimidazopyridine derivative may be synthesized from an iodonium salt or boron ester precursor (type A or B precursor) represented by Formula 2 below:

[Formula 2]

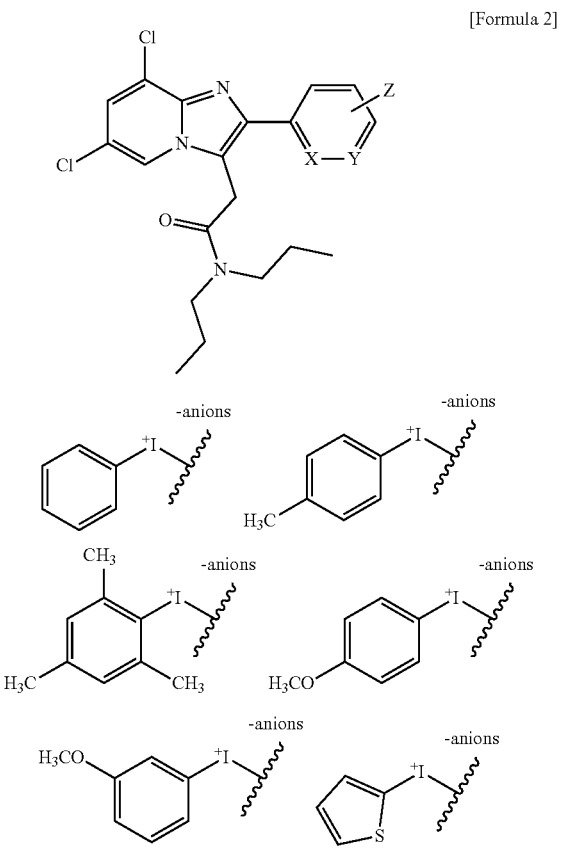

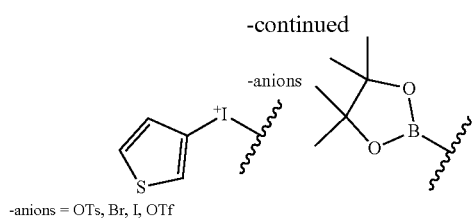

-anions = OTs, Br, I, OTf wherein X is C or N, and Y is C or N.

As shown in Reaction Scheme 1 below, the fluorine-18-labeled radiotracer of Formula 1 may be produced by reacting the iodonium salt or boron ester precursor of Formula 2 with a [$^{18}$F] cesium fluoride compound formed through the phase transition catalyst (18-crown-6/cesium hydrogen carbonate) added to increase the fluorine-18 labeling reactivity, thereby labeling the aromatic ring with $^{18}$F:

[Reaction Scheme 1]

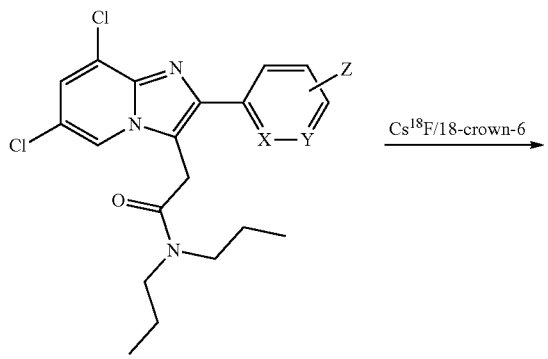

The reaction product of Reaction Scheme 1 above may be an iodonium salt or boron ester precursor, and Z in Reaction Scheme 1 above may be a functional group selected from the group consisting of iodobenzene tosylate, iodotoluene tosylate, 2-iodo-1,3,5-trimethylbenzene tosylate, 4-iodoanisole tosylate, 3-iodoanisole tosylate, 2-iodothiophene tosylate, 3-iodothiophene tosylate, iodobenzene bromide, iodotoluene bromide, 2-iodo-1,3,5-trimethylbenzene bromide, 4-iodoanizole bromide, 3-iodoanisole bromide, 2-iodocyophene bromide, 3-iodothiophene bromide, iodobenzene iodide, iodotoluene iodide, 2-iodo-1,3,5-trimethylbenzene iodide, 4-iodoanisole iodide, 3-iodoanisole iodide, 2-iodothiophene iodide, 3-iodothiophene iodide, iodobenzene triflate, iodotoluene triflate, 2-iodo-1,3,5-trimethylbenzene triflate, 4-iodoanisole triflate, 3-iodoanisole triflate, 2-iodothiophene triflate, 3-iodothiophene triflate, and pinacol boron ester.

In Reaction Scheme 1, Y may be carbon in the case where X is nitrogen, and X may be carbon in the case where Y is nitrogen. Alternatively, both X and Y may be carbon.

In the production of the fluorine-18-labeled radiotracer compound of Formula 1, the introduction of $^{18}$F may be performed by a process including the steps of: preparing a water-evaporated fluorine-18 reaction solution by heating to a temperature of 85 to 95° C. in a CH$_3$CN solvent containing 18-crown-6/cesium hydrogen carbonate to [$^{18}$F] cesium fluoride; and transferring the [$^{18}$F] cesium fluoride into a reaction container in which the starting material of Formula 2 and TEMPO or a copper catalyst (copper(II) trifluoromethanesulfonate, or tetrakis (pyridine) copper (II) triflate) are dissolved in a CH$_3$CN or DMF solvent, followed by heating and reaction.

After the 2-fluoroaryl-6,8-dichloroimidazopyridine derivative having fluorine-18 introduced thereto is produced by the above-described process, it may be cooled to room temperature and separated/purified by HPLC.

The compound of Formula 2, which is used as a starting material in the production of the fluorine-18-labeled radiotracer, has a structure in which the benzene or pyridine ring on the right side of the iodonium salt precursor is substituted with iodobenzene tosylate, iodotoluene tosylate, or the like, which results in the difference in electron density of the benzene or pyridine ring of the iodonium salt precursor between the two aromatics on both sides with respect to iodine. As a result, the substituent exhibits the effect of increasing the yield and selectivity while allowing the right ring of the iodonium salt precursor to be substituted directly with fluorine-18.

The 2-fluoroaryl-6,8-dichloroimidazopyridine derivative represented by Formula 1 may be produced by the method shown in Reaction Scheme 2 below:

[Reaction Scheme 2]

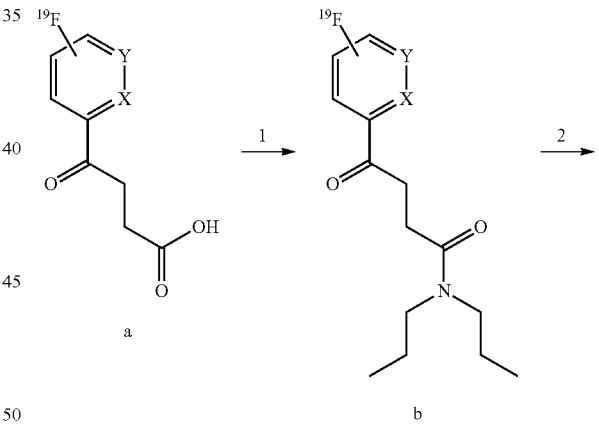

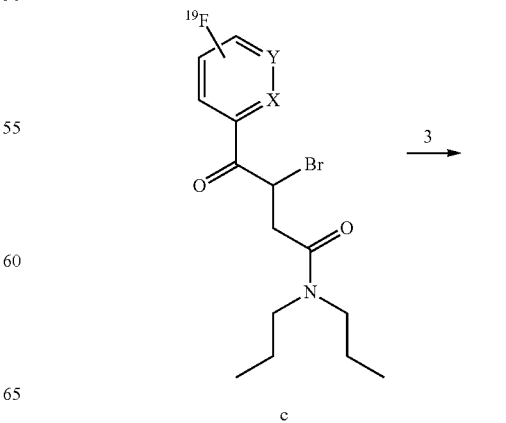

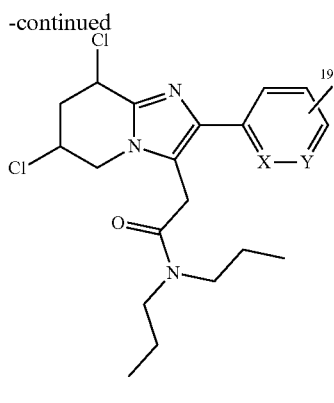

d wherein compound d in Reaction Scheme 2 is a kind of 2-fluoroaryl-6,8-dichloroimidazopyridine derivative of Formula 1.

That is, the fluoroaryl-6,8-dichloroimidazopyridine derivative may be produced through the steps of: producing compound (b) by reacting compound (a) with dipropylamine in the presence of 1,1'-carbonyldiimidazole and TEA in a tetrahydrofuran solvent (derivative production step 1); producing compound (c) by reacting compound (b) with bromine in a tetrachlorocarbon solvent (derivative production step 2); and producing compound (d) by reacting compound (c) with 2-amino-3,5-dichloropyridine in a dimethylformamide solvent (derivative production step 3).

During the production of the fluoroaryl-6,8-dichloroimidazopyridine derivative, the intermediate product obtained in each step may be separated/purified by a filtration method, a purification method or the like known in the organic synthesis field.

The fluorine-18 [$^{18}$F]-introduced fluoroaryl-6,8-dichloroimidazopyridine derivative of Formula 1 may be produced from the iodonium salt or boron ester precursor represented by Formula 2 below:

[Formula 2]

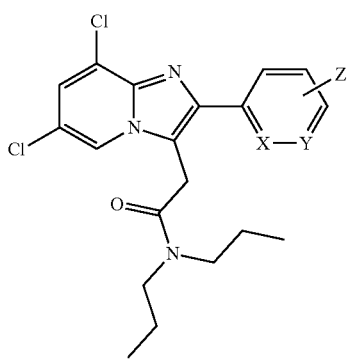

wherein Z, X and Y are as defined above with respect to Formula 2.

The iodonium salt or boron ester precursor of Formula 2 may be used as a starting material for producing the fluorine-18 [$^{18}$F]-introduced fluoroaryl-6,8-dichloroimidazopyridine derivative of Formula 1. Z in Formula 2 allows the electron density of the right ring of the iodonium salt precursor to be different from that of the aromatic compound on the opposite side with respect to iodine, so that it exhibits the effect of increasing the yield and selectivity while allowing fluorine-18 to be introduced directly to the benzene or pyridine on the right side of the iodonium salt precursor.

The produce of introducing a fluorine-containing —Z group to the 2-aryl-6,8-dichloroimidazopyridine derivative may be performed by the step of introducing the —Z group to the right ring of the 2-aryl-6,8-dichloroimidazopyridine derivative (compound (e)), as shown in Reaction Schemes 3 and 4 below:

[Reaction Scheme 3]

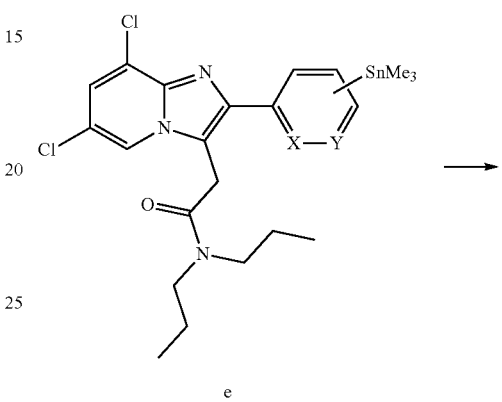

e

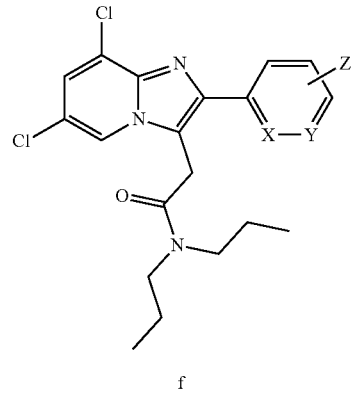

f

[Reaction Scheme 4]

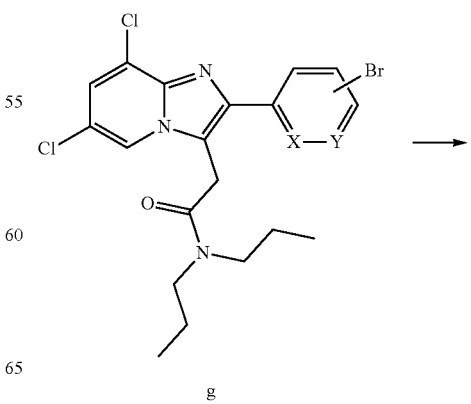

g

-continued

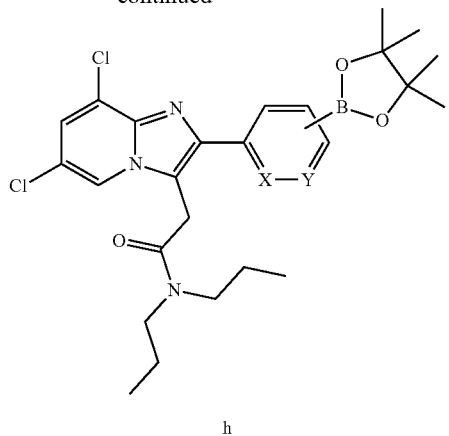

h

In Reaction Schemes 3 and 4, Z, X and Y are as defined above with respect to Formula 2.

In Reaction Scheme 3 above, the compounds that are reacted with compound (3) to introduce the —Z group may be (diacetoxy) arene and para-toluene sulfonic acid.

In Reaction Scheme 4 above, the compounds that are reacted with compound (g) to introduce a boron ester group may be bis(pinacolato)diboron and [1,1'-bis(diphenylphosphino)ferrocene]palladium(II) dichloride.

The reaction of Reaction Scheme 3 may be performed by dissolving diacetoxyarene in a $CH_3CN$ solvent, adding para-toluene sulfonic acid thereto, and adding thereto dropwise a solution of a composition for the introduction of the —Z group in a chloroform solvent, followed by stirring at 50° C. for 15 to 18 hours.

The reaction of Reaction Scheme 4 may be performed by adding, to a dimethylformamide solvent, a compound for the introduction of the —R group, bis(pinacolato)diboron and [1,1'-bis(diphenylphosphino)ferrocene] palladium(II) dichloride, followed by stirring at 80° C. for 5 hours.

In still another aspect, the present invention also provides a sensitizer-labeled, translocator protein overexpression-targeting tracer for fluorescence imaging-guided surgery and photodynamic therapy, which is represented by Formula 3 below and produced by a method including the step of producing a fluorescent ligand through a reaction between a 2-aryl-6,8-dichloroimidazopyridine derivative precursor substituted with one or more PEG chains having a functional group, which is generally (universally) used for bonding to a biomolecule as shown in Formula 4 below, and a fluorescent dye or photodynamic therapy sensitizer having a functional group for complementary bonding to the precursor:

[Formula 3]

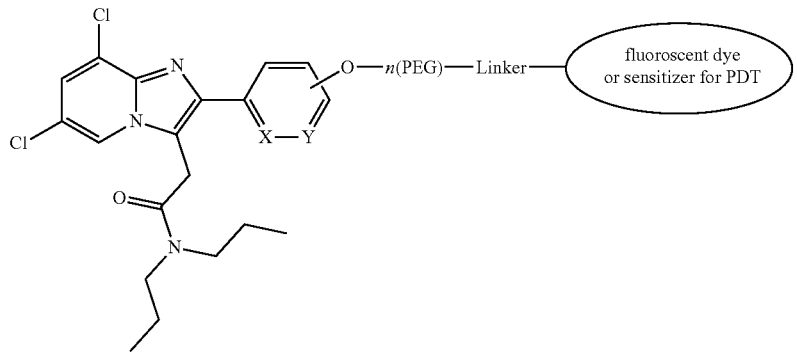

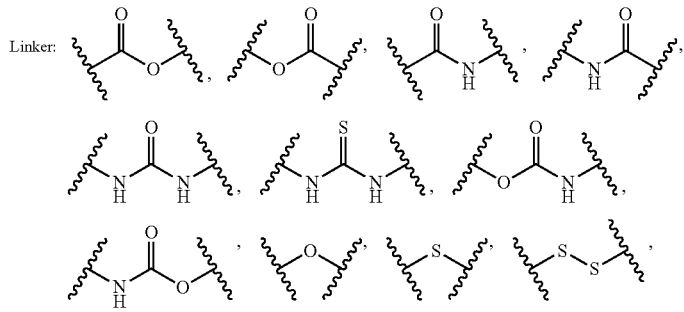

wherein X is C or N, and Y is C or N. In addition, the number (n) of the polyethylene glycol (PEG) chains is 1 to 10. The linker that connects the PEG to the fluorescent dye or photodynamic therapy sensitizer may be a compound selected from the group consisting of ether, amide, ester, urea, urethane, thiourea, and disulfide, and the PEG is substituted at any one of the 2-, 3- and 4-positions of the ring containing X and Y.

The PEG chain-substituted 2-aryl-6,8-dichloroimidazopyridine derivative having a fluorescent dye or the sensitizer introduced thereto may be synthesized from a PEG chain-substituted 2-aryl-6,8-dichloroimidazopyridine derivative precursor represented by Formula 4 below:

[Formula 4]

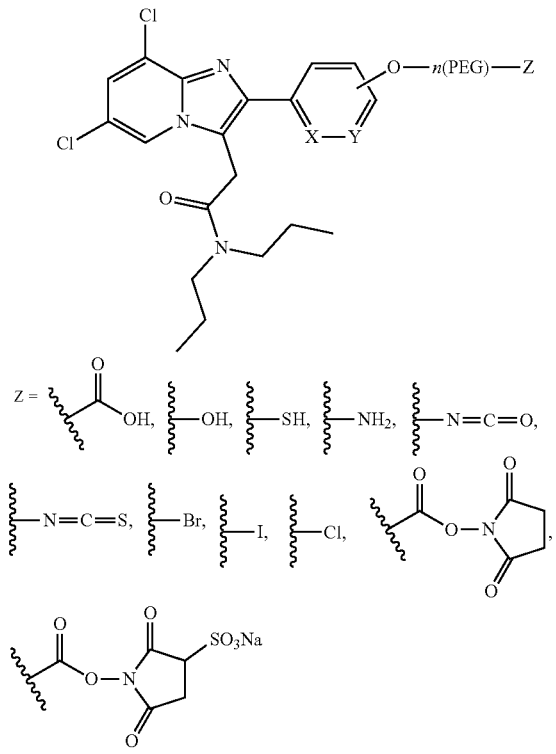

In Formula 4 above, X is C or N, and Y is C or N. In addition, the number (n) of the polyethylene glycol chains is 1 to 10. Z in Formula 4 may be a functional group selected from the group consisting of acid, alcohol, thiol, amine, isocyanate, isothiocyanate, bromide, iodide, chloride, N-succinimidyl ester, and sulfo-N-succinimidyl ester, and the PEG is substituted at any one of the 2-, 3- and 4-positions of the ring containing X and Y.

As shown in the Reaction Scheme below, the PEG chain-substituted 2-aryl-6,8-dichloroimidazopyridine derivative having a fluorescent dye or sensitizer introduced thereto as shown in Formula 3 above may be produced through a reaction between the 2-aryl-6,8-dichloroimidazopyridine derivative precursor, substituted with one or more PEG chains as represented by Formula 4 above, which have a functional group which is generally (universally) used to connect a particular molecule to a biomolecule by covalent bonding, and a fluorescent dye or photodynamic therapy sensitizer having a functional group for complementary bonding to the precursor.

The fluorescent dye or sensitizer that is used in the present invention may be a compound selected from the group consisting of porphyrin-based compounds, porphyrin precursor-based compounds, phthalocyanine-based compounds, porphycene-based compounds, chlorine-based compounds, fluorescein-based compounds, anthracene-based compounds, hypericin, furocoumarin-based compounds, chlorophyll derivatives, purpurin-based compounds, phenothiazines, methylene blue, violet green, azure C, thionine, nile blue A, hypocrellin, rose bengal, rhodamine 123, IR-700, IR-780, PC-413, and lutetium texaphyrin.

The porphyrin-based compound may be selected from the group consisting of hematoporphyrin derivatives, dihematoporphyrin ether/ester, porfimer sodium, tetrasodium-meso-tetraphenylporphyrin-sulphonate, and metallotetraazaporphyrin.

The porphyrin precursor-based compound may be selected from the group consisting of d-aminolevulinic acid (ALA), d-aminolevulinic acid (ALA)-methyl-, propyl-, and hexyl-esters.

The phthalocyanine-based compound may be selected from the group consisting of chloroaluminum tetrasulfonated phthalocyanine, zinc(II) phthalocyanine, silicone naphthalocyanine, and aluminum sulfonated phthalocyanine.

The porphycene-based compound may be selected from the group consisting of 9-acetoxy-2,7,12,17-tetra-N-propylporphycene, 2-hydroxyethyl-7,12,17-tris(methoxyethyl) porphycene, and 23-carboxy-24-methoxycarbonylbenzo(2, 3)-7,12,17-tri(methoxyethyl)-porphycene.

The chlorine-based compound may be selected from the group consisting of mono-aspartyl chlorine e6, diaspartyl chlorine e6, chlorine e6 sodium, and bacteriochlorin.

The fluorescein-based compound may be selected from the group consisting of fluorescein sodium and tetrabromo-fluorescein-eosin.

The anthracene-based compound may be selected from the group consisting of anthraquinone, acridine orange, and acridine yellow.

The furocoumarin-based compound may be selected from the group consisting of 5-methooxypsoralen and 8-methoxypsoralen.

The purpurin-based compound may be selected from the group consisting of metallopurpurin and tin etiopurpurin.

The fluorine-18-introduced 2-fluoroaryl-6,8-dichloroimidazopyridine derivative of Formula 1 has a high binding affinity for TSPO present in the outer mitochondrial membrane in cells, and thus may be a PET radiotracer for diseases related to TSPO overexpression. The positrons released from fluorine-18 after binding to TSPO in the body meet electrons in the body and annihilate. Two gamma-ray energies (511 keV) produced during the annihilation may be collected and a relevant region showing high specific expression of TSPO in the body may be directly and non-invasively imaged by PET.

In addition, the fluorescent molecule-introduced 2-aryl-6,8-dichloroimidazopyridine derivative of Formula 3 may bind to cancer cells specifically expressing TSPO in the body by a mechanism similar to the above-described mechanism, thus providing an image guide to a correct tumor site during tumor surgery. Alternatively, it may be used as a sensitizer that can more effectively receive the light in the therapeutic wavelength range from an affected area. In addition, it may be used in photodynamic therapy in which it binds directly to TSPO in a tumor, and then induces cell necrosis when locally exposed to a light source. When a fluorescent dye is introduced to the 2-aryl-6,8-dichloroimidazopyridine derivative compound having the property of binding to TSPO overexpressed in vivo and is injected in vivo and the relevant region is irradiated with light having a specific wavelength corresponding to the fluorescent dye after sufficient targeting of TSPO, the substance bound thereto can be visualized by light emission, thus providing guidelines for tumor surgery. Alternatively, the 2-aryl-6,8-dichloroimidazopyridine derivative having introduced thereto a sensitizer for photodynamic therapy can treat a tumor by releasing reactive oxygen species into the relevant region when receiving light having a specific wavelength.

Furthermore, when a sensitizer for PDT is introduced to the fluorescent molecule-introduced 2-aryl-6,8-dichloroimidazopyridine derivative of Formula 3, there are advantages in that non-invasive therapy is possible in the same manner as PET, and in that in the case of cancer which can lose the functionality of a normal organ due to surgery, a therapy that kills only cancer cells by simply irradiating light is possible.

The uptake and release of the 2-aryl-6,8-dichloroimidazopyridine derivative in a brain and a tumor may be controlled by modifying X or Y of the aryl on the right side of the 2-aryl-6,8-dichloroimidazopyridine derivative of Formula 1 or 2 or by changing the position of substitution of fluorine-18 or a fluorescent dye or sensitizer introduced via one or more PET chains. If necessary, the uptake and release rates of the derivative may be controlled by increasing the polarity of these substituents.

Therefore, the 2-aryl-6,8-dichloroimidazopyridine derivatives of Formulas 1 and 3 according to the present invention may advantageously be used to determine whether various brain diseases and tumors associated with translocator protein overexpression are present or to diagnose and treat the relevant region by administration to mammals, preferably humans.

Preparation Examples: Preparation of Starting Material for Producing Iodonium Salt or Boron Ester Precursor Preparation Example 1: Preparation of 2-(6,8-dichloro-2-(4-(trimethylstannyl) phenyl)-imidazo[1,2-a]pyridin-3-yl)-N,N-dipropylacetamide

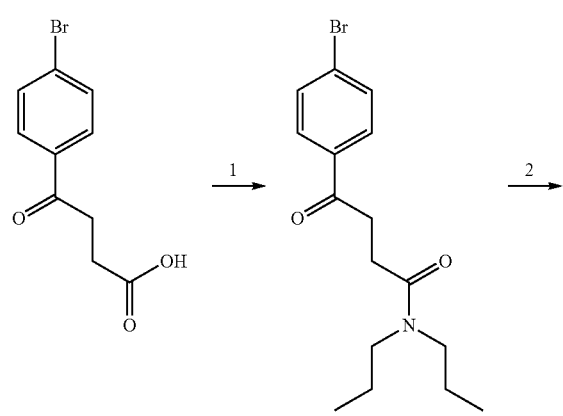

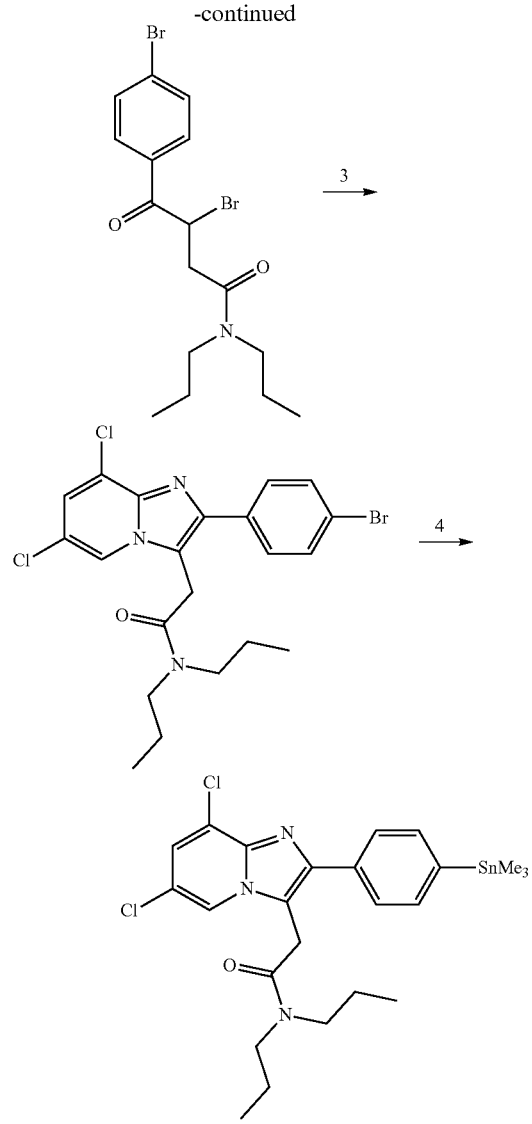

(Step 1): Preparation of 4-(4-bromophenyl)-4-oxo-N,N-dipropylbutanamide 3-(4-bromobenzoyl)propionic acid (2.0 g, 7.8 mmol) and 1,1'-carbonyldiimidazole (1.4 g, 8.6 mmol) were dissolved in tetrahydrofuran (THF, 50 ml) and stirred for 30 minutes. After 30 minutes, N,N'-dipropylamine (1.2 mL, 8.6 mmol) and triethylamine (1.3 ml, 9.4 mmol) were added thereto, followed by stirring for 3 hours. After the solvent was removed under reduced pressure, a 0.1 N aqueous solution of hydrogen chloride was added thereto, followed by extraction with ethyl acetate. The extracted organic layer was dried over sodium sulfate and filtered, and the remaining organic solvent was evaporated under reduced pressure. The residue was purified by column chromatography to afford the desired compound.

$^1$H NMR (400 MHz, CDCl$_3$) δ 0.86 (t, J=7.4 Hz, 3H, CH$_3$), 0.95 (t, J=7.4 Hz, 3H, CH$_3$), 1.53 (q, J=7.4 Hz, 2H, CH$_2$), 1.65 (q, J=7.4 Hz, 2H, CH$_2$), 2.77 (t, J=7.4 Hz, 2H, CH$_2$CO), 3.2-3.4 (m, 6H, CH$_2$N+CH$_2$CO), 7.58 (d, J=6.8 Hz, 2H, Ar), 7.86 (d, J=6.8 Hz, 2H, Ar); $^{13}$C NMR (100 MHz, CDCl$_3$) δ 198.6, 171.1, 135.8, 132.0, 131.9, 129.8, 129.7, 128.2, 49.7, 47.9, 33.9, 27.3, 22.3, 21.1, 11.6, 11.5, 11.4; Anal. Calculated for ($C_{16}H_{22}BrNO_2$): C, 56.48; H, 6.52; N, 4.12%. Found: C, 56.59; H, 6.50; N, 4.11%. MS: calculated for [M]$^+$=339 Found: MS m/z (% relative to the base peak)=339 (5, M+), 239 (base); IR (KBr): 1639, 1687 cm$^{-1}$.

(Step 2): Preparation of 3-bromo-4-(4-bromophenyl)-4-oxo-N,N-dipropylbutanamide

To a solution of 4-(4-bromophenyl)-4-oxo-N,N-dipropylbutanamide (2.0 g, 5.9 mmol) in tetrachlorocarbon (50 mL), a solution of bromine (0.33 ml, 6.5 mmol) in tetrachlorocarbon (1 mL) was added slowly. The reaction mixture was stirred for 3 hours, and then the solvent was removed under reduced pressure. The residue was treated with a saturated aqueous solution of sodium hydrogen carbonate and extracted with ethyl acetate. The extracted organic layer was dried over sodium sulfate and filtered, and the remaining organic solvent was evaporated under reduced pressure. The residue was purified by column chromatography to afford the desired compound.

$^1$H NMR (400 MHz, CDCl$_3$) δ 0.83 (t, J=7.4 Hz, 3H, CH$_3$), 0.98 (t, J=7.4 Hz, 3H, CH$_3$), 1.49 (q, J=7.4 Hz, 2H, CH$_2$), 1.66 (q, J=7.4 Hz, 2H, CH$_2$), 3.01 (dd, J$_1$=16.0 Hz, J$_2$=4.4 Hz, 1H, CH$_2$CO), 3.1-3.4 (m, 4H, CH$_2$N), 3.57 (dd, J$_1$=16.0 Hz, J$_3$=9.9 Hz, 1H, CH$_2$CO), 5.59 (dd, J$_3$=9.9 Hz, J$_2$=4.4 Hz, 1H, CHBr), 7.62 (d, J=6.8 Hz, 2H, Ar), 7.91 (d, J=6.8 Hz, 2H, Ar); $^{13}$C NMR (100 MHz, CDCl$_3$) δ 192.4, 169.3, 133.2, 132.3, 132.1, 130.7, 130.6, 130.5, 128.9, 49.7, 47.6, 40.6, 38.5, 38.4, 22.2, 21.0, 11.5, 11.4; Anal. Calculated for ($C_{16}H_{21}Br_2NO_2$): C, 45.85; H, 5.05; N, 3.34%. Found: C, 46.03; H, 5.03; N, 3.35%. MS: calculated for [M]$^+$=419 Found: MS m/z (% relative to the base peak)=419 (0.5, M+), 319 (base); IR (KBr): 1689, 1683 cm$^{-1}$.

(Step 3): Preparation of 2-(2-(4-bromophenyl)-6,8-dichloro-imidazo[1,2-a]pyridin-3-yl)-N,N-dipropylacetamide To a solution of 3-bromo-4-(4-bromophenyl)-4-oxo-N,N-dipropylbutanamide (2.0 g, 4.8 mmol) in dimethylformamide (DMF, 25 mL), 2-amino-3,5-dichloropyridine (1.0 g, 6.2 mmol) was added. The reaction mixture was stirred under reflux for 18 hours. The solvent was removed under reduced pressure, and the residue was dissolved in ethyl acetate and treated with a 0.1N aqueous solution of hydrochloric acid, and then the organic layer was extracted. The extracted organic layer was dried with sodium sulfate, and the remaining solvent was removed under reduced pressure. The residue was purified by column chromatography to afford the desired compound.

$^1$H NMR (400 MHz, CDCl$_3$) δ 0.77 (t, J=7.4 Hz, 3H, CH$_3$), 0.86 (t, J=7.4 Hz, 3H, CH$_3$), 1.2-1.3 (m, 4H, CH$_2$), 3.12 (t, J=7.7 Hz, 2H, CH$_2$NCO), 3.30 (t, J=7.7 Hz, 2H, CH$_2$NCO), 4.04 (s, 2H, CH$_2$CO), 7.30 (d, J=1.9 Hz, 1H, Ar), 7.53 (d, J=8.2 Hz, 2H, Ar), 7.60 (d, J=8.2 Hz, 2H, Ar), 8.24 (d, J=1.9 Hz, 1H, Ar); $^{13}$C NMR (100 MHz, CDCl$_3$) δ 167.4, 144.8, 141.6, 133.1, 132.3, 130.9, 125.3, 123.8, 123.1, 122.1, 120.1, 117.9, 50.4, 48.5, 30.6, 22.7, 21.4, 11.8, 11.5; Anal. Calculated for ($C_{21}H_{22}BrCl_2N_3O$): C, 52.20; H, 4.59; N, 8.70%. Found: C, 52.34; H, 4.57; N, 8.74%. MS: calculated for [M]$^+$=483 Found: MS m/z (% relative to the base peak)=483 (3, M+), 128 (base). ESI-MS: calculated for [M−H]$^-$=482. Found=482: IR (KBr): 1698 cm$^{-1}$.

(Step 4): Preparation of 2-(6,8-dichloro-2-(4-(trimethylstannyl) phenyl)-imidazo[1,2-a]pyridin-3-yl)-N,N-dipropylacetamide 2-(2-(4-bromophenyl)-6,8-dichloro-imidazo[1,2-a]pyridin-3-yl)-N,N-dipropylacetamide (0.5 g, 1.04 mmol) was dissolved in (dioxane, 20 ml), and then hexamethyldistin (0.43 mL, 2.08 mmol) and tetrakis (triphenylphosphin) palladium (0.17 g, 0.15 mmol) were added thereto. The mixture was stirred at 120° C. under an argon atmosphere for 6 hours. After the temperature was lowered, the reaction mixture was filtered through celite, and then extracted with water and ethyl acetate. The extracted organic layer was dried over sodium sulfate, and the remaining solvent was removed under reduced pressure. The residue was purified by column chromatography to afford the desired compound.

$^1$H NMR (400 MHz, CDCl$_3$) b 0.32 (s, 3H, CH$_3$Sn), 0.67 (t, J=7.4 Hz, 3H, CH$_3$), 0.86 (t, J=7.4 Hz, 3H, CH$_3$), 1.4-1.6 (m, 4H, CH$_2$), 3.06 (t, J=7.7 Hz, 2H, CH$_2$NCO), 3.29 (t, J=7.7 Hz, 2H, CH$_2$NCO), 4.09 (s, 2H, CH$_2$CO), 7.30 (d, J=1.9 Hz, 1H, Ar), 7.59 (d, J=7.8 Hz, 2H, Ar), 7.63 (d, J=7.8 Hz, 2H, Ar), 8.36 (d, J=1.9 Hz, 1H, Ar); $^{13}$C NMR (100 MHz, CDCl$_3$) δ 167.3, 145.7, 143.0, 141.3, 136.2, 133.6, 128.5, 124.7, 123.4, 122.0, 120.0, 117.4, 50.1, 48.2, 30.5, 22.4, 21.1, 11.4, 11.0, −9.4; Anal. Calculated for ($C_{24}H_{31}Cl_2N_3OSn$): C, 50.83; H, 5.51; N, 7.41%. Found: C, 51.08; H, 5.52; N, 7.43%. ESI-MS: calculated for [M+Na]$^+$= 590. Found=590: IR (KBr): 1645 cm$^{-1}$.

According to the method for producing a fluorine-18-labeled PET radiotracer for targeting translocator protein overexpression according to the present invention, a product having high molar activity can be obtained. According to the method, in order to make fluorine-18 easy to handle in mass production, a fluorine-18 reaction solution is prepared by adding, to CH$_3$CN, water containing fluorine-18 dissolved therein. In order to use a diaryliodonium salt whose aromatic ring compound can be labeled with nucleophilic fluorine-18 without having to use a separate electron-attracting functional group, 2-(6,8-dichloro-2-(4-(trimethylstannyl)phenyl)-imidazo[1,2-a]pyridin-3-yl)-N,N-dipropylacetamide is produced and reacted with 4-(diacetoxy)iodoarene to obtain a ((4-(6,8-dichloro-3-(2-(dipropylamino)-2-oxoethyl)imidazo[1,2-a]pyridin-2-yl)phenyl) (aryl)iodonium) anion precursor. This iodonium salt precursor is dissolved in CH$_3$CN to obtain an iodonium salt reaction solution. By reacting the fluorine-18 reaction solution with the iodonium salt reaction solution, a radiotracer composition ([$^{13}$F]BS224) containing a fluorine-18-labeled radiotracer compound may be easily obtained.

In the present invention, the step of producing the ((4-(6,8-dichloro-3-(2-(dipropylamino)-2-oxoethyl)imidazo[1,2-a]pyridin-2-yl)phenyl) (aryl)iodonium) anion precursor by reacting 2-(6,8-dichloro-2-(4-(trimethylstannyl)phenyl)-imidazo[1,2-a]pyridin-3-yl)-N,N-dipropylacetamide with 4-(diacetoxy)iodotoluene may be performed, as shown in Reaction Scheme 5 below.

[Reaction Scheme 5]

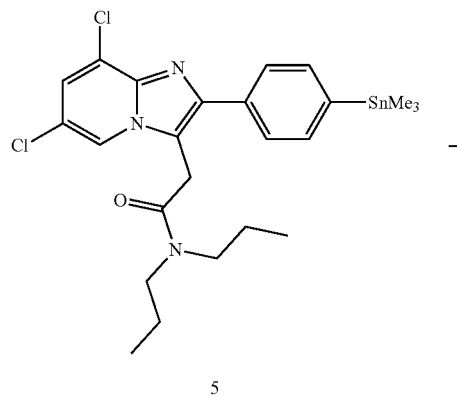

5

Diaryl iodonium salts precursor

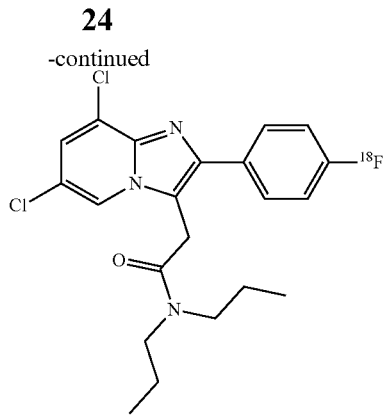

[$^{18}$F]8S224

Meanwhile, the step of preparing the fluorine-18 reaction solution may be performed by further adding cesium hydrogen carbonate/18-crown-6 to CH$_3$CN to promote the reactivity of fluorine.

The production method may further include the first purification step of purifying the radiotracer composition by adding an aqueous hydrochloric acid solution to the radiotracer composition, followed by adsorption onto a C18 Sep-Pak cartridge, washing with water, and then elution with ethanol. In addition, the production method may further include the second purification step of purifying the radiotracer composition using a high-performance liquid chromatography (HPLC) system equipped with a 244 to 264 nm UV detector and a radioisotope gamma-ray detector. Through these purification steps, it may be possible to produce a fluorine-18-labeled PET radiotracer ([$^{13}$F]BS224) for targeting translocator protein overexpression having higher purity and activity.

To use the ability of the 2-aryl-6,8-dichloroimidazopyridine derivative to be specifically taken up into an inflammation or tumor region, a PEG chain-substituted 2-aryl-6,8-dichloroimidazopyridine derivative having a sensitizer introduced thereto as shown in Formula 3 above may be produced by introducing, for example, an IR-780 compound, through amide bonding, as shown in Reaction Scheme 6 below:

[Reaction Scheme 6]

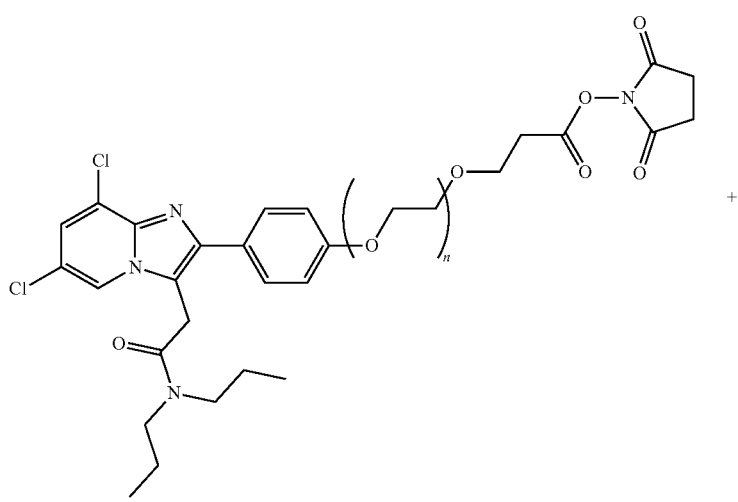

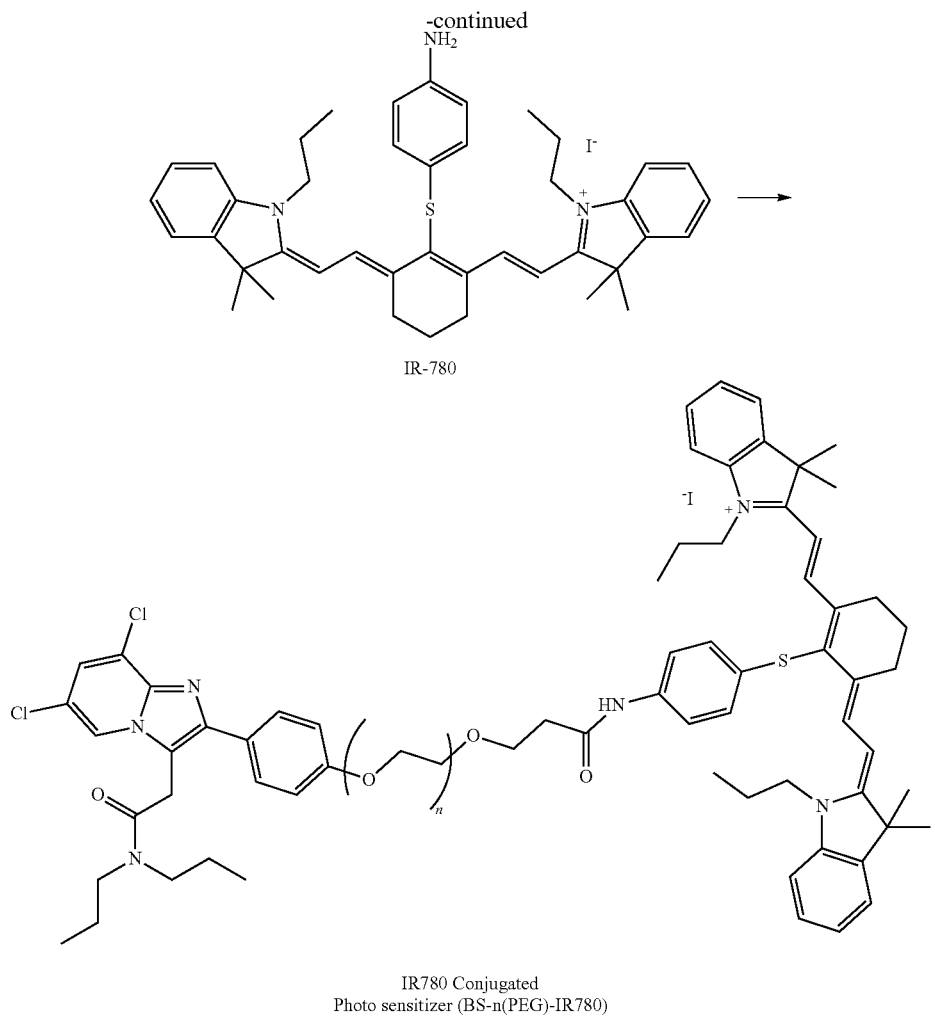

IR-780

IR780 Conjugated
Photo sensitizer (BS-n(PEG)-IR780)

This compound produced by introducing the photosensitizer IR-780 compound to the 2-aryl-6,8-dichloroimidazopyridine derivative has the following advantages when used in photodynamic therapy. Since IR-780 acts as a compound that generates heat in cells, into which it has been taken up, when receiving light having a specific wavelength (780 to 800 nm), a therapy that burns a tumor by heat generated by irradiating light into a region into which the compound has been taken up may be applied even to a case in which surgery for selectively removing a tumor such as a bladder tumor is difficult and to a tumor therapy in which the functionality of an organ is highly likely to be lost due to surgery.

The present invention also provides a fluorine-18-labeled PET radiotracer ([$^{18}$F]BS224) for targeting translocator protein overexpression represented by Formula 5 below, which is produced by a method including the steps of: preparing a water-evaporated fluorine-18 reaction solution by adding water containing fluorine-18 dissolved thereto to CH$_3$CN, followed by heating to a temperature of 85 to 95° C.; producing a ((4-(6,8-dichloro-3-(2-(dipropylamino)-2-oxoethyl)imidazo[1,2-a]pyridin-2-yl)phenyl) (aryl)iodonium) anion precursor as an iodonium salt precursor by reacting a 2-trimethyltinaryl-6,8-dichloroimidazopyridine derivative with 4-(diacetoxy)iodoarene; preparing an iodonium salt precursor reaction solution by dissolving the precursor and 2,2,6,6-tetramethyl-1-piperidinyloxy in CH$_3$CN; and producing a radiotracer composition containing a fluorine-18-labeled radiotracer compound by adding the iodonium salt precursor reaction solution to the fluorine-18 reaction solution, followed by heating and reaction.

[Formula 5]

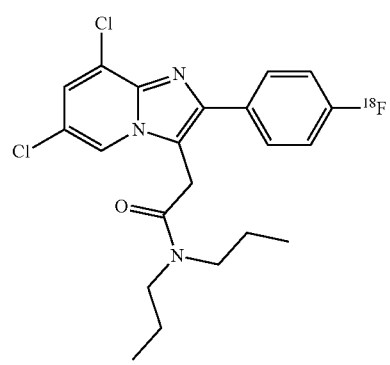

That is, the fluorine-18-labeled PET radiotracer ([$^{18}$F]BS224, 2-(6,8-dichloro-2-(4-[$^{18}$F]fluorophenyl)imidazo[1,2-a]pyridin-3-yl)-N, N-dipropylacetamide) for targeting translocator protein overexpression according to the present invention makes it possible to obtain new images of neuroinflammation and tumors associated with translocator protein overexpression by positron emission tomography, thus diagnosing patients with various brain diseases and tumors associated with translocator protein overexpression. In addition, by virtue of the long half-life of fluorine 18, the PET radiotracer of the present invention can provide brain neuroinflammation and tumor imaging diagnostics to a larger number of patients compared to conventional carbon-11 tracers.

In the present invention, a 2-pyridyl-6,8-dichloroimidazopyridine derivative may be synthesized as shown in Reaction Scheme 6 such that it has a pyridine ring instead of the benzene ring on the right side of the [$^{18}$F]BS224 compound. The release of the synthesized derivative compound in a normal brain is suppressed, and thus the synthesized derivative compound may more rapidly provide the difference between a TSPO-overexpressing region and normal cells.

Example 1: Synthesis of 2-(6,8-dichloro-2-(4-[$^{18}$F] fluorophenyl)imidazo[1,2-a]pyridin-3-yl)-N,N-dipropylacetamide Using Iodonium Salt Precursor

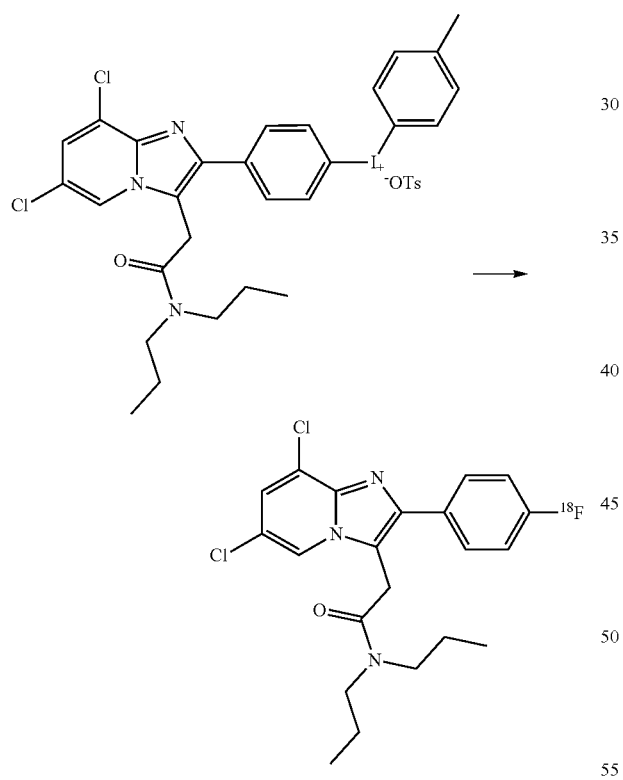

50 to 100 μL of water having dissolved therein fluorine-18 produced from a cyclotron was added to a solution of CsHCO$_3$ (1.0 mg) and 18-crown-6 (10.0 mg) in acetonitrile (container 1). The solvent was completely evaporated by azeotropic distillation while the solution was heated to 90° C. under nitrogen. An iodonium salt precursor (4 mg, (4-(6,8-dichloro-3-(2-(dipropylamino)-2-oxoethyl)imidazo[1,2-a]pyridin-2-yl)phenyl) (p-tolyl)iodonium) and 1 mg of 2,2,6,6-tetramethyl-1-piperidinyloxy were dissolved in 0.3 ml of acetonitrile (container 2), and then the solution was added to container 1, followed by reaction by heating at 140° C. for 10 minutes. After the reaction, 10 mL of a 0.1 N aqueous solution of HCl was added to the reaction product which was then adsorbed onto a C18-light Sep-Pak cartridge, washed with 10 mL of water, and then eluted with 0.5 mL of ethanol. The eluted solution was purified using an HPLC system (Waters, Xterra Semi-preparative C18 column, 10×250 mm, 10 μm; 50% acetonitrile-water, 254 nm, flow rate: 5.0 mL/min) equipped with a 254 nm UV detector and a radioisotope gamma-ray detector, and fluorine-18-labeled [$^{18}$F]BS224 was isolated with a radiochemical yield of about 25% at 34 minutes.

Example 2: Synthesis of 2-(6,8-duchloro-2-(4-[$^{18}$F] fluorophenyl)imidazo[1,2-a]pyridin-3-yl)-N,N-dipropylacetamide Using Boron Ester Precursor

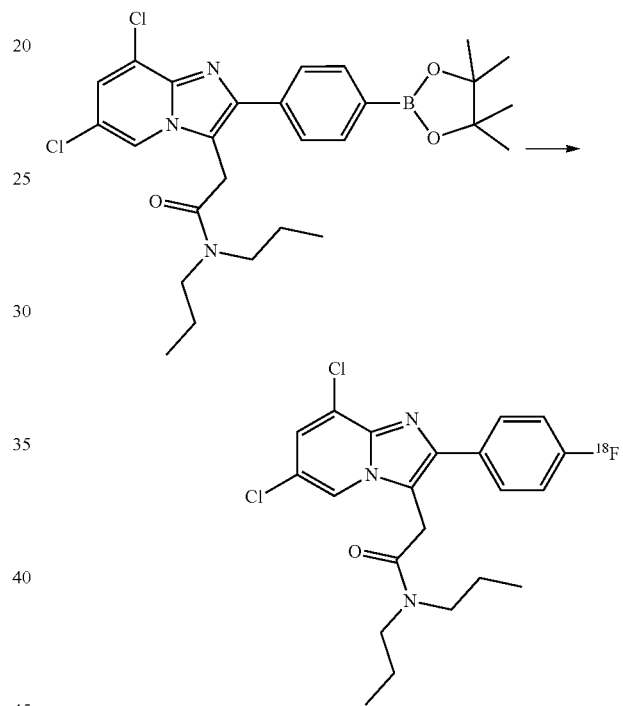

50 to 100 μL of water having dissolved therein fluorine-18 produced from a cyclotron was added to a solution of CsHCO$_3$ (1.1 mg) and 18-crown-6 (3.5 mg) or K$_2$CO$_3$ (0.8 mg) and K$_{222}$ (5.0 mg) in acetonitrile (container 1). The solvent was completely evaporated by azeotropic distillation while the solution was heated to 90° C. under nitrogen. A boron ester precursor (3 mg, 2-(6,8-dichloro-2-(4-(4,4,5,5-tetramethyl-1,3,2-dioxaborolan-2-yl)phenyl)imidazo[1,2-a]pyridin-3-yl-N,N-dipropylacetamide) and a copper catalyst (0.2 mg of copper(II) trifluoromethanesulfonate, or 0.4 mg of tetrakis(pyridine)copper(II) triflate) were dissolved in 0.5 ml of acetonitrile (container 2), and then the solution was added to container 1, followed by reaction by heating at 110° C. for 10 minutes. After the reaction, 10 mL of a 0.1 N aqueous solution of HCl was added to the reaction product which was then adsorbed onto a C18-light Sep-Pak cartridge, washed with 10 mL of water, and then eluted with 0.5 mL of ethanol. The eluted solution was purified using an HPLC system (Waters, Xterra Semi-preparative C18 column, 10×250 mm, 10 μm; 50% acetonitrile-water, 254 nm, flow rate: 5.0 mL/min) equipped with a 254 nm UV detector and a radioisotope gamma-ray detector, and fluorine-18-labeled [$^{13}$F]BS224pyridine was isolated with a radiochemical yield of about 9% at 34 minutes.

Example 3: Production of 2-(6,8-dichloro-2-(4-fluorophenyl)imidazo[1,2-a]pyridin-3-yl)-N,N-dipropylacetamide

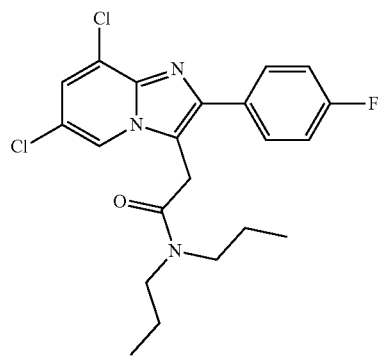 [SMILES: CCCN(CCC)C(=O)Cc1c(-c2ccc(F)cc2)nc2c(Cl)cc(Cl)cn12]

To a solution of 18-crown-6 (25.0 μmol) in acetonitrile (0.3 mL), a solution of cesium fluoride (25.0 μmol) in water (10 μL) was added. The solvent was completely evaporated by azeotropic distillation while the solution was heated at 90° C. under nitrogen. To the remaining material, a solution of (4-(6,8-dichloro-3-(2-(dipropylamino)-2-oxoethyl)imidazo[1,2-a]pyridin-2-yl)phenyl) (p-tolyl)iodonium tosylate in acetonitrile (0.3 ml) was added, followed by heating at 80 to 140° C. for 1 hour with stirring. After cooling to room temperature, the reaction mixture was purified using an HPLC system (Waters, Xterra Semi-preparative C18 column, 10×250 mm, 10 μm; 50% acetonitrile-water, 254 nm, flow rate: 5.0 mL/min) equipped with a 254 nm UV detector and a radioisotope gamma-ray detector, and 2-(6,8-dichloro-2-(4-fluorophenyl)imidazo[1,2-a]pyridin-3-yl)-N,N-dipropylacetamide (BS224) was isolated at about 34 minutes.

$^1$H NMR (400 MHz; CDCl$_3$) δ 8.26 (d, J=1.6 Hz, 1H), 7.63 (dd, J=5.6 Hz, 8.8 Hz, 2H), 7.29 (d, J=2.0 Hz, 1H), 7.15 (t, J=8.8 Hz, 2H), 4.04 (s, 2H), 3.29 (t, J=7.6 Hz, 2H), 3.10 (t, J=7.6 Hz, 2H), 1.44-1.60 (m, 4H), 0.86 (t, J=7.2 Hz, 3H), 0.75 (t, J=7.2 Hz, 3H); 13C NMR (100 MHz; CDCl$_3$) δ 167.2, 164.3, 161.8, 144.7, 141.2, 130.9, 130.8, 130.7, 130.6, 130.0, 129.9, 124.9, 124.7, 123.4, 121.8, 121.7, 120.0, 117.3, 116.1, 115.9, 115.8, 50.0, 48.2, 30.3, 22.4, 21.0, 11.5, 11.4, 11.2, 11.1; $^{19}$F NMR (375 MHz; CDCl$_3$) δ-113.2; Anal. Calculated for (C$_{21}$H$_{22}$Cl$_2$FN$_3$O): C, 59.72; H, 5.25; N, 9.95%. Found: C, 59.77; H, 5.21; N, 9.98%. ESI-MS: calculated for [M–H]$^-$=421. Found=421: IR (KBr): 1640 cm$^{-1}$.

Example 4: Production of 2-(6,8-dichloro-2-(4-fluorophenyl)imidazo[1,2-a]pyridin-3-yl)-N,N-dipropylacetamide

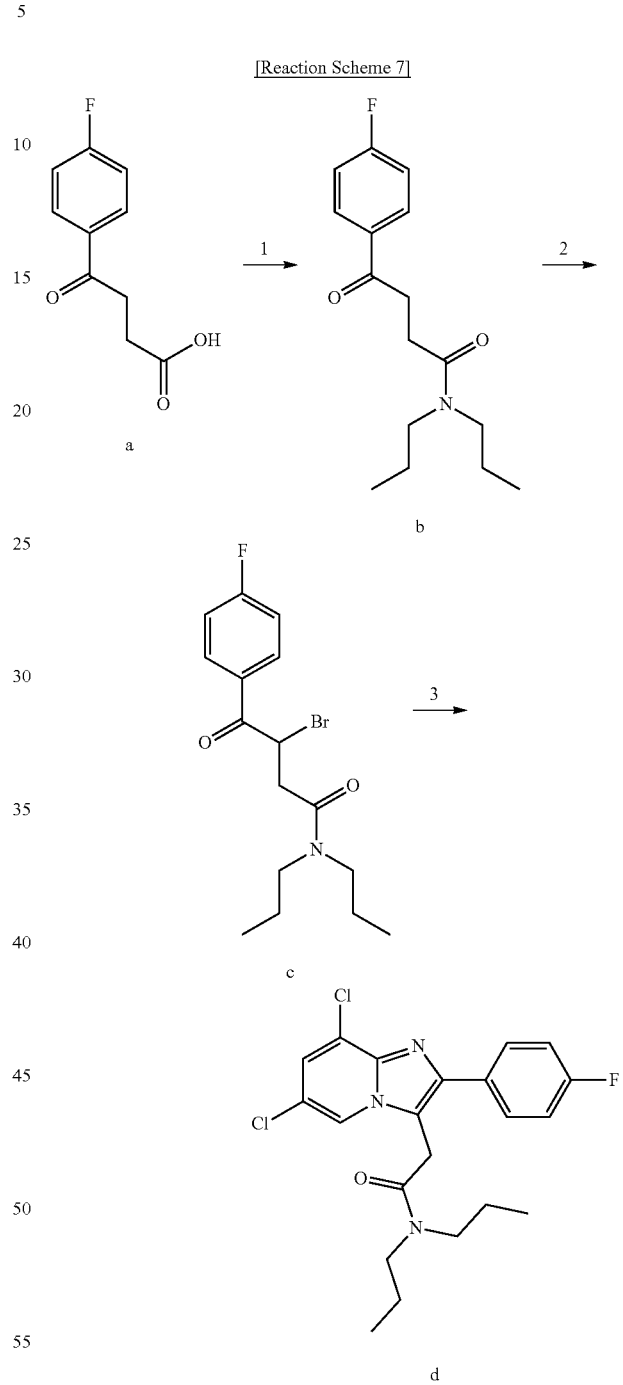

(Step 1) Production of 4-(4-fluorophenyl)-4-oxo-N,N-dipropylbutanamide 3-(4-fluorobenzoyl)propionic acid (5.0 g, 25.5 mmol) and 1,1'-carbonyldiimidazole (4.5 g, 28.0 mmol) were dissolved in tetrahydrofuran (THF, 50 ml) and stirred at room temperature for 30 minutes. After 30 minutes, N,N'-dipropylamine (4.2 mL, 30.6 mmol) and TEA (4.6 mL, 33.1 mmol) were added to the reaction solution which was then stirred for 4 hours. After the solvent was removed under reduced pressure, the residue was treated with a 0.1N aqueous solution of hydrochloric acid, and then extracted with ethyl acetate. The extracted organic layer was dried over sodium and then filtered, and the organic solvent was removed under reduced pressure. The residue was purified by column chromatography to afford the desired compound.

$^1$H NMR (400 MHz, CDCl$_3$) δ 0.86 (t, J=7.4 Hz, 3H, CH$_3$), 0.95 (t, J=7.4 Hz, 3H, CH$_3$), 1.53 (q, J=7.4 Hz, 2H, CH$_2$), 1.65 (q, J=7.4 Hz, 2H, CH$_2$), 2.77 (t, J=7.4 Hz, 2H, CH$_2$CO), 3.2-3.4 (m, 6H, CH$_2$N+CH$_2$CO), 7.12 (d, J=6.8 Hz, 2H, Ar), 7.90 (d, J=6.8 Hz, 2H, Ar); Anal. Calculated for (C$_{16}$H$_{22}$FNO$_2$): C, 68.79; H, 7.94; N, 5.01%. Found: C, 68.94; H, 7.90; N, 5.03%. MS: calculated for [M]$^+$=279 Found: MS m/z (% relative to the base peak)=279 (5, M+), 179 (base). IR (KBr): 1640, 1685 cm$^{-1}$.

(Step 2) Production of 3-bromo-4-(4-fluorophenyl)-4-oxo-N,N-dipropylbutanamide

To a solution of 4-(4-fluorophenyl)-4-oxo-N,N-dipropylbutanamide in a tetrachlorocarbon solvent, a solution of Br$_2$ (0.6 mL, 11.8 mmol) in a tetrachlorocarbon solvent was added slowly. The reaction mixture was stirred for 2 hours, and then the solvent was removed under reduced pressure. The residue was treated with a saturated aqueous solution of sodium hydrogen carbonate, and then extracted with ethyl acetate. The extracted organic layer was evaporated under reduced pressure, and the residue was purified by column chromatography to afford the desired compound.

$^1$H NMR (400 MHz, CDCl$_3$) δ 0.83 (t, J=7.4 Hz, 3H, CH$_3$), 0.98 (t, J=7.4 Hz, 3H, CH$_3$), 1.49 (q, J=7.4 Hz, 2H, CH$_2$), 1.66 (q, J=7.4 Hz, 2H, CH$_2$), 3.02 (dd, J$_1$=16.0 Hz, J$_2$=4.4 Hz, 1H, CH$_2$CO), 3.1-3.4 (m, 4H, CH$_2$N), 3.57 (dd, J$_1$=16.0 Hz, J$_3$=9.9 Hz, 1H, CH$_2$CO), 5.59 (dd, J$_3$=9.9 Hz, J$_2$=4.4 Hz, 1H, CHBr), 7.12 (d, J=6.8 Hz, 2H, Ar), 7.90 (d, J=6.8 Hz, 2H, Ar); Anal. Calculated for (C$_{16}$H$_{21}$BrFNO$_2$): C, 53.64; H, 5.91; N, 3.91%. Found: C, 53.73; H, 5.89; N, 3.93%. MS: calculated for [M]$^+$=358 Found: MS m/z (% relative to the base peak)=358 (0.9, M+), 259 (base); IR (KBr): 1690, 1687 cm$^{-1}$.

(Step 3) Production of 2-(6,8-dichloro-2-(4-fluorophenyl)imidazo[1,2-a]pyridin-3-yl)-N,N-dipropylacetamide To a solution of 3-bromo-4-(4-fluorophenyl)-4-oxo-N,N-dipropylbutanamide (2.0 g, 5.6 mmol) in dimethylformamide (DMF, 25 mL), 2-amino-3,5-dichloropyridine (1.2 g, 7.3 mmol) was added. The reaction mixture was stirred under reflux for 12 hours. After 12 hours, the solvent was removed under reduced pressure, and the residue was dissolved in ethyl acetate and extracted by treatment with a 0.1N aqueous solution of hydrochloric acid. The extracted organic layer was evaporated under reduced pressure and then dried over sodium sulfate, and the solvent was removed under reduced pressure. The residue was purified by column chromatography to afford the desired compound.

$^1$H NMR (400 MHz, CDCl$_3$) δ 0.77 (t, J=7.4 Hz, 3H, CH$_3$), 0.86 (t, J=7.4 Hz, 3H, CH$_3$), 1.2-1.3 (m, 4H, CH$_2$), 3.12 (t, J=7.7 Hz, 2H, CH$_2$NCO), 3.30 (t, J=7.7 Hz, 2H, CH$_2$NCO), 4.04 (s, 2H, CH$_2$CO), 7.30 (d, J=1.9 Hz, 1H, Ar), 7.23 (d, J=8.2 Hz, 2H, Ar), 7.56 (d, J=8.2 Hz, 2H, Ar), 8.23 (d, J=1.9 Hz, 1H, Ar); Anal. Calculated for (C$_{21}$H$_{22}$Cl$_2$FN$_3$O) C, 59.72; H, 5.25; N, 9.95%. Found: C, 59.77; H, 5.21; N, 9.98%. ESI-MS: calculated for [M−H]$^-$=421. Found=421. IR (KBr): 1640 cm$^{-1}$.

Example 5: Production of (4-(6,8-dichloro-3-(2-(dipropylamino)-2-oxoethyl)imidazo[1,2-a]pyridin-2-yl)phenyl) (p-tolyl)iodonium tosylate

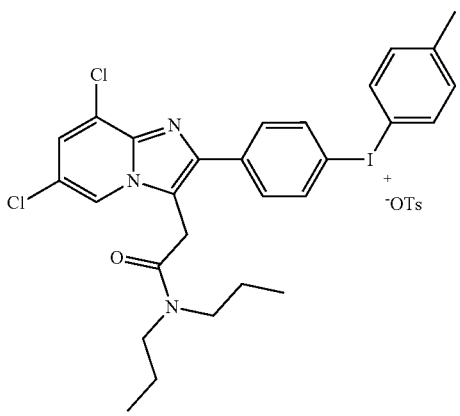

4-(diacetoxy)iodotoluene (235.2 mg, 0.7 mmol) was dissolved in acetonitrile (4 mL), para-toluene sulfonic acid (133.2 mg, 0.7 mmol) was added thereto, and then immediately the reaction solution was diluted in chloroform (20 ml). After the reaction was stirred at room temperature for 5 minutes, a solution of 2-(6,8-dichloro-2-(4-(trimethylstannyl)phenyl)-imidazo[1,2-a]pyridin-3-yl)-N,N-dipropylamide in chloroform (4 mL) was added slowly thereto. The reaction mixture was stirred at 50° C. for 18 hours. After cooling to room temperature, the organic solvent was removed under reduced pressure. The residue was extracted with dichloromethane and water, and the extracted organic layer was evaporated under reduced pressure. The obtained oil was dissolved in a small amount of dichloromethane and diethyl ether (v/v=1:1), and then added slowly to a conical tube containing cold diethyl ether (10 mL). Next, the solid was separated by centrifugation.

$^1$H NMR (400 MHz; CDCl$_3$) δ ppm: 8.03 (d, J=1.6 Hz, 1H), 7.99 (d, J=8.4 Hz, 2H), 7.77 (d, J=8.4 Hz, 2H), 7.64 (d, J=8.4 Hz, 2H), 7.53 (bd, J=7.6 Hz, 2H), 7.29 (d, J=1.6 Hz, 1H), 7.11 (d, J=8.0 Hz, 2H), 7.03 (bd, J=7.6 Hz, 2H), 4.02 (s, 2H), 3.32-3.26 (m, 2H), 3.23-3.17 (m, 2H), 2.34 (s, 3H), 2.29 (s, 3H), 1.60-1.50 (m, 4H), 0.86 (t, J=7.6 Hz, 3H), 0.80 (t, J=7.2 Hz, 3H); $^{13}$CNMR (100 MHz; CDCl$_3$) δ ppm: 166.8, 143.3, 142.9, 141.3, 139.6, 137.4, 135.5, 135.1, 132.7, 131.8, 128.7, 126 0.1, 125.3, 123.7, 121.5, 120.1, 118.7, 115.0, 111.9, 50.1, 48.2, 29.8, 22.4, 21.5, 21.4, 21.1, 11.5, 11.3; MS (ESI) m/z 620 (M$^+$-OTs). HRMS calcd. for C$_{23}$H$_{19}$Cl$_2$IN$_3$O: 620.0732, found: 620.0735.

Example 6: Production of 2-(6,8-dichloro-2-(4-(4,4, 5,5-tetramethyl-1,3,2-dioxaborolan-2-yl)phenyl) imidazo[1,2-a]pyridin-3-yl-N,N-diporpylacetamide

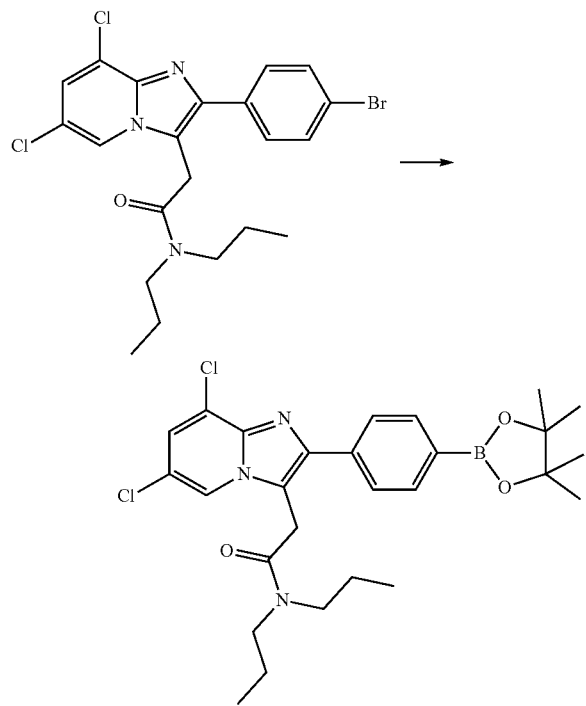

To a solution of 2-(2-(4-bromophenyl)-6,8-dichloro-imidazo[1,2-a]pyridin-3-yl)-N,N-dipropylacetamide (230 mg, 0.48 mmol) in dimethylformamide (DMF, 15 mL), [1,1'-bis (diphenylphosphino) ferrocene]palladium(II) dichloride (41 mg, 0.05 mmol), potassium acetate (141 mg, 1.4 mmol) and bis(pinacolato)diboron (134 mg, 0.53 mmol) were added. The reaction mixture was stirred at 80° C. for 3 hours. After the temperature was lowered to room temperature, the reaction mixture was filtered through celite, and then extracted with water and dichloromethane. The extracted organic solvent was dried over sodium sulfate, and then the solvent was removed under reduced pressure. The residue was purified by column chromatography to afford the desired compound.

$^1$H NMR (400 MHz, CDCl$_3$) δ 0.67 (t, J=7.4 Hz, 3H, CH$_3$), 1.37 (s, 12H, CH$_3$), 0.86 (t, J=7.4 Hz, 3H, CH$_3$), 1.4-1.6 (m, 4H, CH$_2$), 3.09 (t, J=7.7 Hz, 2H, CH$_2$NCO), 3.29 (t, J=7.7 Hz, 2H, CH$_2$NCO), 4.07 (s, 2H, CH$_2$CO), 7.29 (d, J=2.0 Hz, 1H, Ar), 7.67 (d, J=8.0 Hz, 2H, Ar), 7.89 (d, J=8.0 Hz, 2H, Ar), 8.28 (d, J=1.9 Hz, 1H, Ar); $^{13}$C NMR (100 MHz, CDCl$_3$) δ 167.2, 145.2, 141.2, 136.2, 135.1, 128.1, 124.6, 123.3, 121.7, 119.4, 117.6, 83.9, 49.9, 48.0, 31.6, 30.2, 24.9, 22.4, 22.2, 20.9, 14.1, 11.3, 11.0. ESI-MS: calculated for [M+H]$^+$=530. Found=530.

Experimental Example 1: Measurement of In Vitro Stability in Human Serum

In an experiment on the in vitro stability of the fluorine-18-labeled PET radiotracer ([$^{18}$F]BS224) for targeting translocator protein overexpression, 0.4 mL of human serum was mixed with 0.4 mL of 1% ethanol/water containing the fluorine-18-labeled radiotracer ([$^{18}$F]BS224), and then the solution was incubated at 37° C. for 0, 10, 30, 60 and 120 minutes and then analyzed by thin film chromatography. As a result of the analysis, it was confirmed that the fluorine-18-labeled radiotracer ([$^{18}$F]BS224) was at least 98.7% stable for up to 120 minutes, indicating that the fluorine-18-labeled radiotracer ([$^{18}$F] BS224) had sufficient stability to perform in vivo biological studies.

Experimental Example 2: Preparation of LPS-Induced Neuroinflammatory Rat Model For the preparation of a neuroinflammatory rat model, male Sprague-Dawley rats weighing 200 to 250 g were used. The rats were anesthetized, the skull was exposed, and a small hole was punctured using a bone drill. Next, 50 µg of LPS was infused into the predetermined right striatum by the use of a Hamilton syringe at a flow rate of 0.5 µL/min (AP, 0.8 mm; L, −2.7 mm and P, −5.0 mm from the bregma). The Hamilton syringe was sustained in place for 10 min to avoid the backflow of LPS. The small hole in the skull was filled with wax, and the incised scalp was sutured.

Experimental Example 3: Middle Artery Cerebral Artery Occlusion (MCAO) Rat Model 7-Week-old Sprague-Dawley rats were prepared and acclimated for 1 week, and then about 8-week-old rats (weighing 300 g) were subjected to respiratory anesthesia with isoflurane to prepare a middle cerebral artery occlusion model. The rats were laid on their side, and then the feet and head were fixed. Next, the hair on the neck was removed, and the skin was incised about 3 cm. After removing the fat layer under the epidermis, the left carotid artery was exposed to secure the surgical space. After blocking the blood flow by tying the lower part of the common carotid artery, the blood flow was blocked by tying both sides at intervals sufficient to insert a probe into the internal carotid artery. After a small incision was made in the blood flow-blocked portion of the internal carotid artery, a nylon probe was inserted through the incision to the middle cerebral artery. After inserting the probe, the incised neck portion was closed with a stapler, and then the blood flow was blocked for 60 minutes. After removing the stapler, the probe was carefully pulled out and the threads on both sides of the internal carotid artery were removed. Among the two threads, the thread in the direction of the middle cerebral artery was tied again, and then the thread in the total carotid artery was removed. The incised neck portion was sutured.

Experimental Example 4: Measurement of Lipophilicity

For the measurement of lipophilicity, [$^{18}$F]BS224 dispersed in 5% ethanol/saline was added to and mixed with n-octanol (5 mL) and sodium phosphate buffer (0.15 M, pH 7.4, 5.0 mL), and then lipophilicity was measured five times. Samples of each phase were counted for radioactivity, and the lipophilicity was expressed as the ratio of the counts per minute from n-octanol versus that of the sodium phosphate buffer. The lipophilicity of [$^{18}$F]BS224 was 2.78±0.4.

Experimental Example 5: Measurement of In Vitro Binding Affinity

The measurement of the in vitro binding affinities of BS224 for TSPO and CBR was performed by substitution reactions with [$^3$H]PK11195 and [$^3$H]flunitrazepam [see Callaghan, P. D. et al. Comparison of in vivo binding properties of the 18-kDa translocator protein (TSPO) ligands [¹⁸F]PBR102 and [¹⁸F]PBR111 in a model of excitotoxin-induced neuroinflammation. Eur. Nucl. Med. Mol. Imaging 42, 138-51 (2015)].

While the present invention has been described in conjunction with the exemplary embodiments and the drawings, the present invention is not limited to the above-described embodiments, but it will be apparent to those having ordinary knowledge in the art to which the present invention pertains that various modifications and alterations may be made based on the foregoing description.

Therefore, the technical spirit of the present invention should not be defined based on only the above-described embodiments, but should be defined based on the claims as well as equivalents thereto.

INDUSTRIAL APPLICABILITY

The present invention provides a method for producing a fluorine-18-labeled PET radiotracer for targeting translocator protein overexpression, the method including the steps of: preparing a solvent-evaporated fluorine-18 reaction solution by adding water having fluorine-18 dissolved therein to CH₃CN, followed by heating to a temperature of 85 to 95° C.; producing a ((4-(6,8-dichloro-3-(2-(dipropylamino)-2-oxoethyl)imidazo[1,2-a]pyridin-2-yl) phenyl) (aryl) iodonium) anion precursor as an iodonium salt precursor by reacting 2-(6,8-dichloro-2-(4-(trimethylstannyl)phenyl)-imidazo[1,2-a]pyridin-3-yl)-N,N-dipropylacetanide with 4-(diacetoxy)iodotoluene; producing 2-(6,8-dichloro-2-(4-(4,4,5,6-tetramethyl-1,3,2-dioxaborolan-2-yl)phenyl)imidazo[1,2-a]pyridin-3-yl-N,N-dipropylacetamide as a boron ester precursor by reacting 2-(2-(4-bromophenyl)-6,8-dichloro-imidazo[1,2-a]pyridin-3-yl)-N,N-dipropylacetamide with bis(pinacolato)diboron; preparing an iodonium salt reaction solution by dissolving the iodonium salt precursor and 2,2,6,6-tetramethyl-1-piperidinyloxy in acetonitrile; preparing a boron ester precursor reaction solution by dissolving the boron ester precursor and a copper catalyst (copper(II) trifluoromethanesulfonate, or tetrakis(pyridine) copper(II) triflate) in dimethylformamide; and producing a radiotracer composition containing a fluorine-18-labeled radiotracer compound by adding the iodonium salt or boron ester precursor reaction solution to the fluorine-18 reaction solution, followed by heating and reaction.

The use of the fluorine-18-labeled PET radiotracer for targeting translocator protein radiotracer according to the present invention makes it possible to diagnose patients with various brain diseases and tumors by obtaining new images of neuroinflammation, stroke and tumors associated with translocator protein overexpression through PET. In addition, by virtue of the long half-life of fluorine 18, the PET radiotracer of the present invention can provide brain neuroinflammation and tumor imaging diagnostics to a larger number of patients compared to conventional carbon-11 tracers.

What is claimed is:

1. A method for diagnosing neuroinflammation, stroke or cerebral infarction in a subject, comprising administering the fluorine-18-labeled PET radiotracer represented by Formula below to a subject, obtaining in vivo brain PET images of the uptake of the fluorine-18-labeled positron emission tomography (PET) radiotracer in the subject, evaluating the uptake of the fluorine-18-labeled radiotracer in brain

[Formula 1]

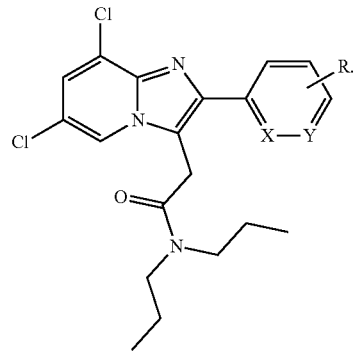

2. The method of claim 1, wherein the evaluating step is performed by evaluating the uptake of the fluorine-18-labeled radiotracer in a portion having cerebral ischemia of the brain.

* * * * *